(12) United States Patent
Ohgose

(10) Patent No.: US 8,548,058 B2
(45) Date of Patent: *Oct. 1, 2013

(54) IMAGE CODING APPARATUS AND METHOD FOR RE-RECORDING DECODED VIDEO DATA

(75) Inventor: Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 909 days.

This patent is subject to a terminal disclaimer.

(21) Appl. No.: 12/186,042

(22) Filed: Aug. 5, 2008

(65) Prior Publication Data

US 2009/0041124 A1 Feb. 12, 2009

(30) Foreign Application Priority Data

Aug. 7, 2007 (JP) .................................. 2007-205864

(51) Int. Cl.
*H04N 7/12* (2006.01)

(52) U.S. Cl.
USPC .................................................... 375/240.16

(58) Field of Classification Search
USPC ........................................ 375/240.01, 240.16
IPC ....................................................... H04N 7/12
See application file for complete search history.

(56) References Cited

U.S. PATENT DOCUMENTS

| 7,447,265 | B2 | 11/2008 | Ohira |  |
|---|---|---|---|---|
| 7,899,117 | B2 * | 3/2011 | Kawaharada | 375/240.16 |
| 7,933,335 | B2 * | 4/2011 | Ikeda et al. | 375/240.16 |
| 2002/0094030 | A1 * | 7/2002 | Kim | 375/240.27 |
| 2003/0039311 | A1 | 2/2003 | Ohira |  |
| 2005/0089098 | A1 | 4/2005 | Sato et al. |  |

FOREIGN PATENT DOCUMENTS

| JP | 11-308617 | 11/1999 |
|---|---|---|
| JP | 2003-143609 | 5/2003 |
| JP | 2005-110083 | 4/2005 |

\* cited by examiner

*Primary Examiner* — David Czekaj
*Assistant Examiner* — Tracy Li
(74) *Attorney, Agent, or Firm* — Wenderoth, Lind & Ponack, L.L.P.

(57) ABSTRACT

Provided is an image coding apparatus including a decoding unit 102 decoding first coded data to generate a decoded picture and decoding information containing motion vectors and including a coding unit 104 coding, in a second coding scheme, the decoded picture generated by the decoding unit 102, to generate second coded data including a coded picture and coding information containing motion vectors. The image coding apparatus also includes a basic motion information generating unit 105 generating basic motion information from either the decoding information or the coding information, wherein the coding unit 104 determines a search range for estimating motion vectors of the decoded picture, according to the basic motion information generated by the basic motion information generating unit 105, estimates motion vectors of the decoded picture in the determined search range, and generates the second coded data including the coded picture and coding information containing the estimated motion vectors.

18 Claims, 15 Drawing Sheets

IMAGE CODING APPARATUS AND METHOD FOR RE-RECORDING DECODED VIDEO DATA

BACKGROUND OF THE INVENTION (1) Field of the Invention

The present invention relates to an image coding apparatus and a method thereof, and particularly relates to an image coding apparatus and a method thereof for coding a picture which has been coded in a first coding scheme, in a second coding scheme.

(2) Description of the Related Art

In recent years, digital video recorders are increasingly popularized which digitalize streams of the Standard Definition Television (SDTV) such as the analog television broadcast, and compress-code them to be recorded on Hard Disk Drives (HDDs) and optical disks such as Digital Versatile Disk Random Access Memory (DVD-RAM) disks. Furthermore, digital video recorders have now begun to be commercialized which are capable of recording streams of the High Definition Television (HDTV) such as the satellite broadcast and the digital terrestrial high-definition television broadcast.

The streams transmitted in the HDTV broadcast are coded in the Moving Picture Experts Group (MPEG)-2 format. When the HDTV broadcast is recorded, it is recorded as the MPEG-2 streams. Alternatively, it is common to decode the images of the streams which have been coded in the MPEG-2 format; convert the decoded images into images having a size defined in the DVD standard; and code the resulting images in the MPEG-2 format before recording. Furthermore, there is also a method of coding, before recording, images of the streams which had been coded in the MPEG-2 format and then decoded, in the H.264 format with a higher coding efficiency compared to the MPEG-2 format. Coding in the H.264 format enables the recording of the HDTV images while suppressing image quality deterioration without changing the HDTV image size, even when the bit rate in the recording is lowered.

However, when coding in the H.264 format, the processing amount greatly increases since the H.264 standard, compared to the MPEG-2 standard, has a higher degree of freedom in motion compensation and there are more pictures which can be referred to.

Further, when coding high-definition (HD) images as in the HDTV broadcast, it is necessary to enlarge the search range in which motion estimation is performed, which in turn further increases the processing amount compared to the case of recording the SDTV broadcast.

The HDTV broadcast images are about six times larger in size than the SDTV broadcast images. Consequently, the recording of the HDTV broadcast even in the MPEG-2 format requires a search range having a size about six times larger than that in the case of recording the SDTV broadcast, in order to achieve about the same performance in the motion vector estimation as in the case of recording the SDTV broadcast.

In addition, compared to the case of recording (coding) the HDTV broadcast in the MPEG-2 format, recording (coding) the HDTV broadcast in the H.264 format requires a processing amount 36 times larger, since the number of macroblocks (MBs), the unit of coding, is six times greater.

Under the MPEG-2 standard, a maximum of two frames (four fields) can be referred to for motion compensation, whereas under the H.264 standard, a maximum of 16 pictures can be referred to. Therefore, the H.264 standard makes it possible to estimate more highly-accurate motion vectors than that in the MPEG-2 standard. However, under the H.264 standard, performing the motion vector estimation on every reference picture requires a processing amount eight times greater than that in the MPEG-2 standard. As described above, coding images in the H.264 format having a higher coding efficiency than the MPEG-2 format entails a problem that the processing amount becomes great compared to the case of coding pictures in the MPEG-2 format.

In view of such a problem, a coding method has been proposed for estimating accurate motion vectors even from narrowed search ranges (e.g. Patent Reference 1: Japanese Examined Patent Application Publication No. 11-308617).

The "digital image coder and motion vector detector used therefor" of the above mentioned Patent Reference 1 use, at the time of coding images, motion vector information of a previously coded picture for determining a search range for motion estimation.

However, in Patent Reference 1, using only the information of a previously coded picture to narrow the search range for the motion estimation makes it unable to follow the motion of the entire picture when an object in the picture suddenly moves in an opposite direction and/or moves at an accelerated speed, and thus, the accuracy of motion vector estimation deteriorates. Moreover, since the motion vector estimated by the accuracy-deteriorated motion estimation is used for determining a search range for further motion estimation, the search range is narrowed based on incorrect information, causing a further deterioration in the motion estimation accuracy. As a result, it is impossible to narrow the search range sufficiently.

SUMMARY OF THE INVENTION

The present invention has been conceived in view of the problems set forth above, and it is an object of the present invention to provide an image coding apparatus and an image coding method capable of coding images by estimating highly accurate motion vectors while reducing the processing amount.

In order to achieve the above mentioned object, the image coding apparatus according to the present invention is an image coding apparatus which converts first coded data coded in a first coding scheme into second coded data coded in a second coding scheme, the apparatus comprising: a decoding unit configured to decode the first coded data to generate a decoded picture and decoding information containing motion vectors; a coding unit configured to code, in the second coding scheme, the decoded picture generated by the decoding unit, to generate the second coded data including a coded picture and coding information containing motion vectors; a decoding information holding unit configured to hold the decoding information generated by the decoding unit; a coding information holding unit configured to hold the coding information generated by the coding unit; and a basic motion information generating unit configured to generate basic motion information indicating a motion of the decoded picture based on either the motion vectors contained in the decoding information held by the decoding information holding unit or the motion vectors contained in the coding information held by the coding information holding unit, wherein the coding unit is configured to (i) determine, as a search range, a range pointed at by the motion indicated by the basic motion information generated by the basic motion information generating unit, (ii) estimate motion vectors of the decoded picture in the determined search range, and (iii)

generate the second coded data including the coded picture and coding information containing the estimated motion vectors.

With this configuration, at the time of motion vector estimation, either the decoding information on the first coded data of an input stream or the coding information used when a previous picture was coded is selected to be used as basic motion information, that is, information which can be used for motion vector estimation, so that a search range for the motion vector estimation can be effectively determined. That is to say, it is possible to perform highly accurate motion vector estimation even when the search range for the motion vector estimation is narrowed based on the basic motion information. Therefore, it is possible to estimate highly accurate motion vectors even when the search range for the motion vector estimation is narrowed to reduce the processing amount. As a result, it is possible to provide an image coding apparatus and an image coding method capable of coding images by estimating highly accurate motion vectors while reducing the processing amount.

Further, it may be that the basic motion information generating unit is configured to select either the motion vectors contained in the decoding information held by the decoding information holding unit or the motion vectors contained in the coding information held by the coding information holding unit, whichever motion vectors having smaller motion vector variance, to generate the basic motion information.

With this configuration, it is possible to generate basic motion information that points at a more highly accurate search range.

Further, it may be that the basic motion information generating unit includes: a generating unit configured to generate a first representative vector representing the motion vectors contained in the decoding information and a second representative vector representing the motion vectors contained in the coding information; and a selecting unit configured to select either the first representative vector or the second representative vector as basic motion information to generate the basic motion information.

With this configuration, selecting either the representative vector representing the motion vectors contained in the decoding information or the representative vector representing the motion vectors contained in the coding information enables generation of basic motion information that points at a more highly accurate search range.

Furthermore, it may be that the generating unit includes: a first average vector computing unit configured to compute, from the decoding information, an average vector as the first representative vector by averaging the motion vectors each of which corresponds to a macroblock and is contained in the decoding information; a first vector variance computing unit configured to compute, from the decoding information, variance of the motion vectors each of which corresponds to a macroblock and is contained in the decoding information; a second average vector computing unit configured to compute, from the coding information, an average vector as the second representative vector by averaging the motion vectors each of which corresponds to a macroblock and is contained in the coding information; and a second vector variance computing unit configured to compute, from the coding information, variance of the motion vectors each of which corresponds to a macroblock and is contained in the coding information, wherein the basic motion information generating unit further includes a comparing unit configured to compare a value of the vector variance computed by the first vector variance computing unit and a value of the vector variance computed by the second vector variance computing unit, and the selecting unit is configured to select either the first representative vector or the second representative vector based on the comparison by the comparing unit, and generate the basic motion information by treating the selected representative vector as basic motion information.

In addition, it may be that the selecting unit is configured to select either the first representative vector or the second representative vector, whichever representative vector having a smaller variance value, based on the comparison by the comparing unit.

With this configuration, a comparison between variance values of motion vectors, each corresponding to a macroblock, enables a selection of either the first representative vector derived from the decoding information or the second representative vector derived from the coding information. Thus, this makes it possible to generate basic motion information that points at a more highly accurate search range.

Further, it may be that the coding information holding unit is configured to hold plural pieces of coding information each containing motion vectors of a decoded picture which has been coded prior to the decoded picture which is a current picture to be coded by the coding unit, and the generating unit is configured to generate, from one of the pieces of the coding information, held by the coding information holding unit, on a decoded picture coded immediately prior to the current decoded picture to be coded, the second representative vector representing the motion vectors contained in the piece of the coding information.

With this configuration, it is possible to generate basic motion information from either the coding information on a picture immediately preceding the current decoded picture to be coded or the decoding information on the current decoded picture to be decoded. As a result, it is possible to generate basic motion information that points at a more highly accurate search range.

Further, it may be that the second average vector computing unit is configured to generate the second representative vector from coding information on a decoded picture having a same picture type as a picture type of the decoded picture which is a current picture to be coded by the coding unit, and coded by the coding unit immediately prior to the current decoded picture to be coded.

With this configuration, it is possible to generate, from the coding information, the second representative vector representing motion vectors which are close to the motion vectors of the current picture to be coded.

Furthermore, it may be that the first average vector computing unit is configured to compute, from the decoding information, an average vector that is an average of motion vectors in a forward prediction direction of the decoded picture which is a current picture to be coded, each of the motion vectors corresponding to a macroblock, and the second average vector computing unit is configured to compute, from the coding information, an average vector that is an average of the motion vectors in the forward prediction direction of the current decoded picture to be coded, each of the motion vectors corresponding to a macroblock.

With this configuration, the generation of a representative vector representing the motion vectors of a decoded picture in the forward prediction direction enables generation of basic motion information that points at a more highly accurate search range.

Moreover, it may be that the first average vector computing unit is configured to compute, for each of prediction directions of the decoded picture which is a current picture to be coded, an average vector that is an average of motion vectors each corresponding to a macroblock of the current decoded picture to be coded, from the decoding information, the second average vector computing unit is configured to compute, for each of the prediction directions of the current decoded picture to be coded, an average vector that is an average of motion vectors each corresponding to a macroblock of the current decoded picture to be coded, from the coding information, the first representative vector is generated for each prediction direction, and includes a first forward representative vector and a first backward representative vector each of which is an average vector computed by the first average vector computing unit for corresponding one of the prediction directions, and the second representative vector is generated for each prediction direction, and includes a second forward representative vector and a second backward representative vector each of which is an average vector computed by the second average vector computing unit for corresponding one of the prediction directions.

With this configuration, generating, for each prediction direction, a representative vector representing motion vectors enables generation of basic motion information that points at a more highly accurate search range.

Further, it may be that the first average vector computing unit and the second average vector computing unit each configured to (i) compute the average vector using a base vector expressed in length and direction of a distance between one frame and another, in the case where the coding unit codes pictures having a frame structure, and (ii) compute the average vector using a base vector expressed in length and direction of a distance between one field and another, in the case where the coding unit codes pictures having a field structure.

With this configuration, it is possible to compute a motion vector representing motion vectors of respective macroblocks, regardless of whether the coding unit codes pictures having a frame structure or a field structure. As a result, generation of basic motion information that points at a more highly accurate search range is possible.

In addition, it may be that the generating unit is configured to (i) divide, into two or more areas, the decoded picture which is a current picture to be coded, (ii) compute, for each of the areas, an average value of the motion vectors computed from the decoding information, and (iii) treat a motion vector having a greatest average value among the computed average values, as the first representative vector, and the generating unit is configured to (i) divide the current decoded picture to be coded into two or more areas, (ii) compute, for each of the areas, an average value of the motion vectors computed from the coding information, and (iii) treat a motion vector having a greatest average value among the computed average values, as the second representative vector.

With this configuration, it is possible to generate, as a representative vector, the average vector of the area having the motion vector with a greater magnitude compared with other motion vectors of respective areas, thereby enabling generation of basic motion information that points at a more highly accurate search range.

Moreover, it may be that the generating unit is configured to (i) divide, into two or more areas, the decoded picture which is a current picture to be coded, (ii) compute, for each of the areas, an average value of the motion vectors computed from the decoding information, and (iii) treat a motion vector having a median value of the computed average values, as the first representative vector, and wherein the generating unit is configured to (i) divide the current decoded picture to be coded into two or more areas, (ii) compute, for each of the areas, an average value of the motion vectors computed from the coding information, and (iii) treat a motion vector having a median value of the computed average values, as the second representative vector.

With this configuration, it is possible to generate, as a representative vector, the motion vector which is the median value of the motion vectors of all the areas, thereby enabling generation of basic motion information that points at a more highly accurate search range.

Further, it may be that the generating unit is configured to (i) divide, into two or more areas, the decoded picture which is a current picture to be coded, (ii) classify average vectors, each of which is an average of motion vectors computed from the decoding information and which is computed for corresponding one of the areas, into groups by magnitude and direction of the average vectors, and (iii) treat a motion vector having an average value of average vectors in a group having a greatest number of average vectors, as the first representative vector, and the generating unit is configured to (i) divide the current decoded picture to be coded into two or more areas, (ii) classify average vectors, each of which is an average of motion vectors computed from the coding information and which is computed for corresponding one of the areas, into groups by magnitude and direction of the average vectors, and (iii) treat a motion vector having an average value of average vectors in a group having a greatest number of average vectors, as the second representative vector.

With this configuration, the basic motion information generating unit can generate, as the basic motion information, a representative vector for each of areas generated through division according to magnitude and direction of motion vectors. When estimating motion vectors, a comparison is made for each of areas generated through division according to magnitude and direction of motion vectors, between the representative vector derived from the decoding information of an input stream (the first coded data) and the representative vector derived from the coding information which was used for coding the previous picture, and then, one of these representative vectors is selected to be used for effectively determining a search range for motion vector estimation.

Moreover, it may be that the basic motion information generating unit is configured to: compute, from the decoding information, a first average vector of motion vectors, each of which corresponds to a macroblock, and a first average of sums of absolute values of the motion vectors each of which corresponds to a macroblock; compute, from the coding information, a second average vector of motion vectors, each of which corresponds to a macroblock, and a second average of sums of absolute values of the motion vectors each of which corresponds to a macroblock; and select either the first average vector or the second average vector, whichever average vector having a smaller difference from the corresponding first or second average of sums of absolute values of the motion vectors, and generate the basic motion information from the selected average vector.

Furthermore, it may be that the coding unit is configured to compute, from the basic motion information, a sum of motion vectors between a current picture to be coded and a reference picture, and to determine a search range for motion vector estimation for each of reference pictures such that a position shifted by the sum of the motion vectors is a center of the search range.

It is to be noted that the present invention can be embodied not only as an apparatus, but also as: an integrated circuit having processing units included in such an apparatus; a method in which the processing units included in the apparatus are implemented as steps; and a program causing a computer to execute such steps. Moreover, such program, information, data and signals may be distributed via recording media such as CD-ROMs and via communication media such as the Internet.

According to the present invention, at the time of motion vector estimation, a search range for the motion estimation is determined based on decoding information of an input stream and on coding information used at the time of coding a previous picture, so that it is possible to estimate highly accurate motion vectors even when the search range for the motion estimation is narrowed for reduction of the processing amount. As a result, it is possible to provide an image coding apparatus and an image coding method capable of coding images by estimating highly accurate motion vectors while reducing the processing amount. Therefore, the present invention is highly practical for use today where the High Definition Television (HDTV) broadcast, such as satellite broadcast and digital terrestrial high-definition television broadcast, is increasingly popularized.

FURTHER INFORMATION ABOUT TECHNICAL BACKGROUND TO THIS APPLICATION

The disclosure of Japanese Patent Application No. 2007-205864 filed on Aug. 7, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

(Embodiment 1)

Hereinafter, Embodiment 1 of the present invention shall be described with reference to the drawings.

Figure 1:
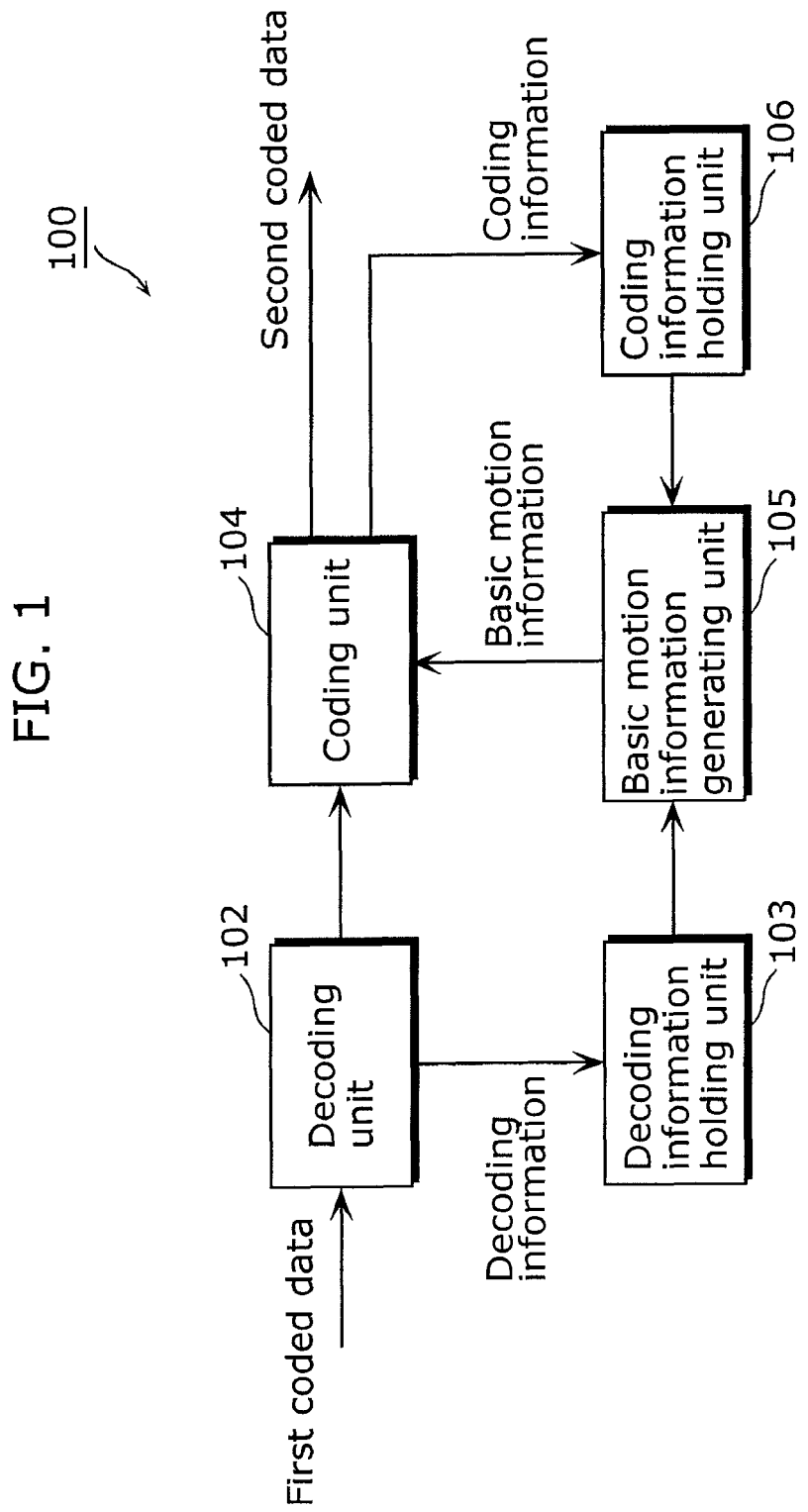
FIG. 1 is a block diagram showing the configuration of an image coding apparatus according to Embodiment 1 of the present invention.

FIG. 1 is a block diagram showing the configuration of an image coding apparatus 100. As FIG. 1 shows, the image coding apparatus 100 converts first coded data, which is coded in a first coding scheme, into second coded data coded in a second coding scheme. The image coding apparatus 100 includes a decoding unit 102, a decoding information holding unit 103, a coding unit 104, a basic motion information generating unit 105, and a coding information holding unit 106.

The following description assumes, as an example, that the first coded data is data coded in the MPEG-2 format, and the second coded data is data coded in the H.264 format. Further, in the following description, frames in frame-structured GOPs (Group of Pictures) are displayed in the following order: I, B, B, P, and fields in field-structured GOPs are displayed in the following order: I, I, B, B, B, B, P, P.

The decoding unit 102 is equivalent to the decoding unit of the present invention, and decodes the first coded data and generates a decoded picture and decoding information which contains motion vectors. To be more specific, the decoding unit 102 decodes the first coded data which has been inputted, in accordance with a syntax of the MPEG-2 standard. The syntax here is a rule concerning compress-coded data strings, and indicates a method for constructing a bit stream of coded data.

For decoding the first coded data, the decoding unit 102 extracts, from a stream of the first coded data, information containing luminance information and motion information such as information on the entire sequence (e.g. sequence header), information on a GOP (GOP header), picture information (e.g. picture header), slice information (slice), and macroblock information (e.g. macroblock modes) (hereinafter referred to as decoding information). The decoding unit 102 generates a decoded picture by decoding the inputted first coded data based on the extracted decoding information. Further, the decoding unit 102 provides the extracted information to the decoding information holding unit 103 as decoding information.

Under the MPEG-2 standard, pictures are coded by employing inter-frame motion compensation, and thus the order of recording the coded pictures may become different from the order of display. The decoding unit 102, which codes pictures through conversion from the MPEG-2 format to the H.264 format, may rearrange the decoded pictures according to the display order before providing the same to the coding unit 104, or provide the decoded pictures to the coding unit 104 without changing the coding order. For example, when a picture recorded in the MPEG-2 format is to be coded in the H.264 format in the H.264 picture type equivalent to the picture type of the picture recorded in the MPEG-2 format, it is unnecessary for the decoding unit 102 to rearrange the pictures according to the display order, since about the same reference picture types will be used for motion prediction.

The decoding information holding unit 103 is equivalent to the decoding information holding unit of the present invention, and holds decoding information generated by the decoding unit. To be more specific, the decoding information holding unit 103 holds the decoding information extracted and provided by the decoding unit 102, in association with a corresponding decoded picture. The decoding information holding unit 103 forwards the decoding information associated with a corresponding decoded picture, to the basic motion information generating unit 105.

Under the H.264 standard, inter-frame motion compensation can be carried out with seven block sizes including the sizes of a macroblock, a block, and a sub-block, as in the MPEG-2 standard. Generally, block matching is performed with each of the above mentioned block sizes, and a block position and a block size are estimated which minimize an evaluation value such as a sum of absolute differences between a block to be coded and a reference picture. In other words, motion estimation is performed. The search range for the block matching is determined based on basic motion information.

The coding unit 104 is equivalent to the coding unit of the present invention, and codes a decoded picture, generated by the decoding unit, in the second coding scheme, and generates second coded data which includes a coded picture and coding information that contains motion vectors. To be more specific, the coding unit 104 codes, according to the H.264 standard, a decoded picture generated by and received from the decoding unit 102, and outputs, as second coded data 110, the decoded picture on which the coding was performed. In addition, the coding unit 104 provides the coding information holding unit 106 with information containing luminance information and motion information such as a macroblock type, motion vector information, and quantized values used for coding the decoded picture (hereinafter referred to as coding information). It is to be noted that when coding a decoded picture, the coding unit 104 determines a search range for motion estimation based on the basic motion information generated from either the decoding information which was used by the decoding unit 102 when generating the current decoded picture to be coded or the coding information which was used by the coding unit 104 when coding a previous picture (a picture preceding the current decoded picture to be coded).

The coding information holding unit 106 is equivalent to the coding information holding unit of the present invention, and holds coding information generated by the coding unit. More specifically, the coding information holding unit 106 holds the coding information provided by the coding unit 104. The coding information held by the coding information holding unit 106 is used for coding pictures following the current picture.

The basic motion information generating unit 105 is equivalent to the basic motion information generating unit of the present invention, and generates basic motion information that indicates the motion of the decoded picture, using either the motion vectors contained in the decoding information held by the decoding information holding unit or the motion vectors contained in the coding information held by the coding information holding unit. Specifically, the basic motion information generating unit 105 generates basic motion information that indicates a motion of a picture, using either the decoding information on the current picture to be coded (decoded picture) or the coding information on a previously coded picture (picture preceding the current picture to be coded). The basic motion information generating unit 105 makes a comparison between a representative vector representing the motion vectors contained in the decoding information provided by the decoding information holding unit 103 and a representative vector representing the motion vectors contained in the coding information provided by the coding information holding unit 106. Then, the basic motion information generating unit 105 selects either the representative vector representing the motion vectors contained in the decoding information or the representative vector representing the motion vectors contained in the coding information, based on a predetermined selection criterion. Then, the basic motion information generating unit 105 generates basic motion information based on the selected representative vector.

The representative vector to be selected is the one representing motion vectors with less variance.

Figure 2:
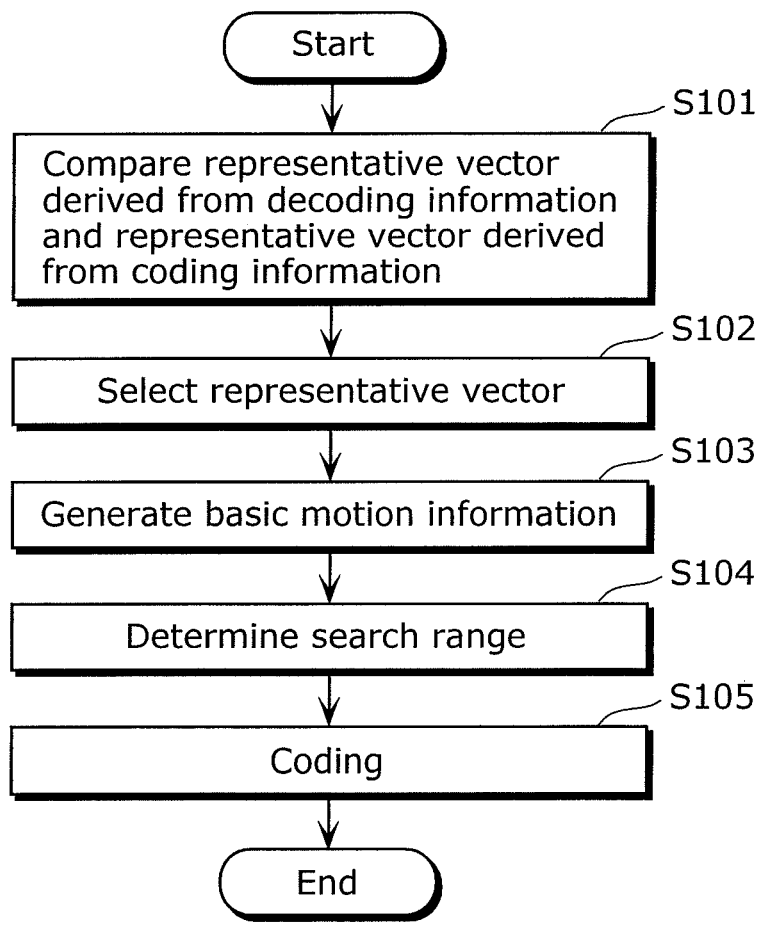
FIG. 2 is a flow chart for describing a process performed by the image coding apparatus according to Embodiment 1 of the present invention for coding images.

FIG. 2 is a flow chart for describing a process performed by the image coding apparatus 100 for coding images.

At first, the coding information holding unit 106 holds the coding information which was used by the coding unit 104 for coding a picture preceding the current decoded picture to be coded. Next, the decoding unit 102 decodes the current picture to be coded, and the decoding information holding unit 103 holds the decoding information which was used for decoding the current picture to be coded.

Next, the basic motion information generating unit 105 makes a comparison between a representative vector representing the motion vectors contained in the decoding information provided by the decoding information holding unit 103 and a representative vector representing the motion vectors contained in the coding information provided by the coding information holding unit 106 (S101).

Next, the basic motion information generating unit 105 selects either the representative vector representing the motion vectors contained in the decoding information or the representative vector representing the motion vectors contained in the coding information, based on a predetermined selection criterion (S102).

Next, the basic motion information generating unit 105 generates basic motion information based on the selected representative vector.

Next, the coding unit 104 determines a search area for motion estimation based on the basic motion information generated by the basic motion information generating unit 105 (S104).

Next, the coding unit 104 estimates motion vectors in the determined search range, and codes the current picture to be coded using the coding information containing e.g. the estimated motion vectors and motion compensation.

The following shall describe how the basic motion information generating unit 105 generates basic motion information, and how the coding unit 104 determines a search range.

First, the following shall describe how the basic motion information generating unit 105 generates basic motion information.

Figure 3:
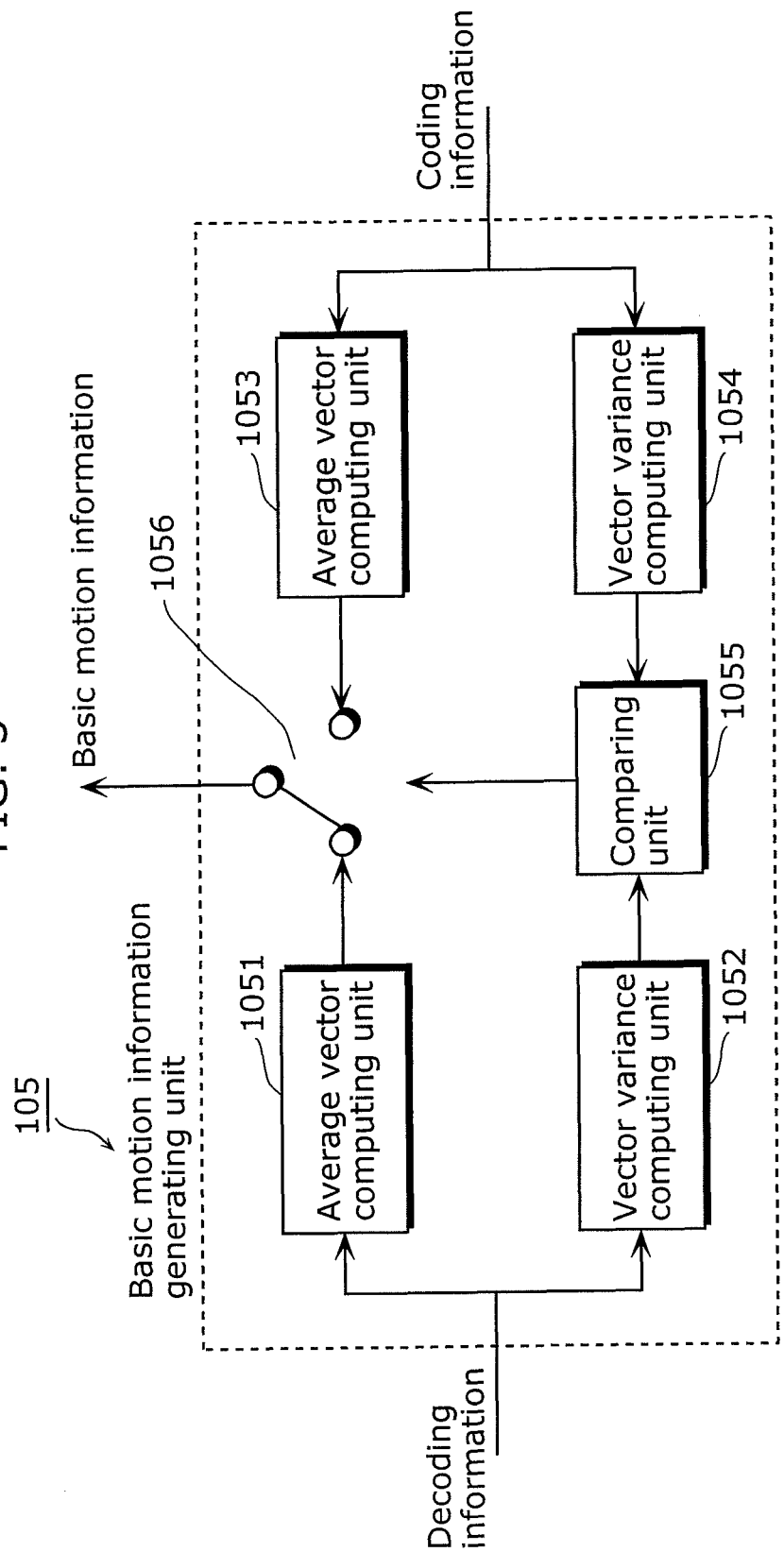
FIG. 3 is a block diagram showing the configuration of a basic motion information generating unit according to Embodiment 1 of the present invention.

FIG. 3 is a block diagram showing the configuration of the basic motion information generating unit 105.

The basic motion information generating unit 105 includes average vector computing units 1051 and 1053, vector variance computing units 1052 and 1054, a comparing unit 1055, and a selector 1056.

The average vector computing unit 1051 computes an average vector from the motion vectors each of which corresponds to a macroblock and is derived from the decoding information provided by the decoding information holding unit 103, and provides the selector 1056 with the computed average vector as a representative vector.

The vector variance computing unit 1052 computes vector variance from the motion vectors each of which corresponds to a macroblock and is derived from the decoding information provided by the decoding information holding unit 103, and provides the comparing unit 1055 with the value of the computed vector variance.

The average vector computing unit 1053 computes an average vector from the motion vectors each of which corresponds to a macroblock and is derived from the coding information provided by the coding information holding unit 106, and provides the selector 1056 with the computed average vector as a representative vector.

The vector variance computing unit 1054 computes vector variance from the motion vectors each of which corresponds to a macroblock and is derived from the coding information provided by the coding information holding unit 106, and provides the comparing unit 1055 with the value of the computed vector variance.

The comparing unit 1055 makes a comparison between the vector variance value provided by the vector variance computing unit 1052 and the vector variance value provided by the vector variance computing unit 1054. The comparing unit 1055 controls the selector 1056 so that the selector 1056 selects either the representative vector corresponding to the vector variance value provided by the vector variance computing unit 1052 or the representative vector corresponding to the vector variance value provided by the vector variance computing unit 1054, based on a predetermined selection criterion, such as a criterion that the representative vector corresponding to a smaller vector variance value is selected.

The selector 1056 is controlled by the comparing unit 1055, and selects either the representative vector which is derived from the decoding information and is provided by the average vector computing unit 1051 or the representative vector which is derived from the coding information and is provided by the average vector computing unit 1053. The representative vector selected by the selector 1056 is provided to the coding unit 104 as the basic motion information.

The case described here is that the basic motion information generating unit 105 outputs a single vector as the basic motion information. Further, the first coded data and the second coded data here both have a frame structure.

Figure 4:
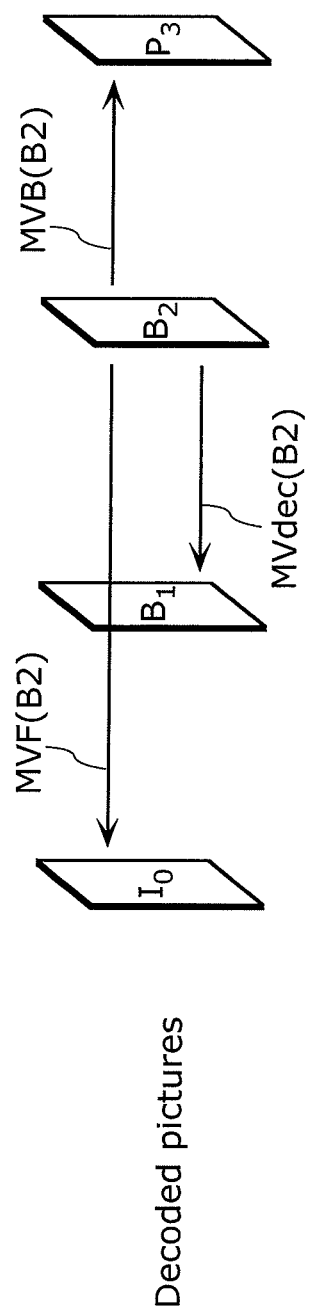
FIG. 4 is a diagram for describing how an average vector and vector variance are computed from decoding information according to Embodiment 1 of the present invention.

FIG. 4 is a diagram for describing how an average vector and vector variance are computed from the decoding information. FIG. 4 shows a case where the decoded first coded data is coded in a frame structure, and a B2 picture is the current picture to be coded by the coding unit 104.

In FIG. 4, there are two pictures that the B2 picture can refer to, namely, an I0 picture and a P3 picture. There are motion vectors MVF (B2) going from the B2 picture to the I0 picture, and motion vectors MVB (B2) going from the B2 picture to the P3 picture. Such motion vectors each corresponding to a macroblock, that is, the motion vectors MVF (B2) and MVB (B2), are "time-scaled" into motion vectors which are to be obtained when a frame immediately preceding the B2 picture is referred to. In other words, the motion vectors, to be obtained when the frame immediately preceding the B2 picture is referred to, are treated as MVdec (B2), and the MVdec (B2) are expressed using the motion vectors MVF (B2) going from the B2 picture to the I0 picture and using the motion vectors MVB (B2) going from the B2 picture to the P3 picture. The relational expression is as follows:

$$MVdec(B2) = \tfrac{1}{2} \times MVF(B2)$$

$$MVdec(B2) = -MVB(B2)$$

The average and variance of the vectors are calculated using the time-scaled motion vectors MVdec (B2).

$$AveMVdec(B2) = \Sigma MVdec(B2)/\text{number of vectors}$$

$$VarMVdec(B2) = \Sigma MVdec(B2)^2/\text{number of vectors} - AveMVdec(B2)^2$$

Here, the coefficient "½" in the expression of "MVdec (B2)=½×MVF (B2)" and the coefficient "−1" in the expression of "MVdec (B2)=−MVB (B2)" are referred to as scaling coefficients.

Further, the AveMVdec (B2) is an average vector, computed by the average vector computing unit 1051 shown in FIG. 3, of the motion vectors each of which corresponds to a macroblock and is obtained from the decoding information.

Further, the VarMVdec (B2) is vector variance, computed by the vector variance computing unit 1052 shown in FIG. 3, of the motion vectors each of which corresponds to a macroblock and is obtained from the decoding information.

Under the MPEG-2 standard, even when pictures have a frame structure, it is possible to code the pictures while switching between frames and fields at a macroblock level. In such a case, motion vectors MVdec (P3) can be computed by changing the scaling coefficient in the temporal direction. To be more specific, in the case of field prediction, there are four combinations as follows, and the above mentioned scaling coefficient (½) is changed as follows:

(1) A top field refers to another top field. Scaling coefficient is ½.

(2) A top field refers to a bottom field. Scaling coefficient is ⅔.

(3) A bottom field refers to a top field. Scaling coefficient is ⅖.

(4) A bottom field refers to another bottom field. Scaling coefficient is ½.

In the present Embodiment 1, pictures have a frame structure, and the second B picture is the current picture to be coded by the coding unit 104. It is to be noted, however, that the first B picture or the P picture may be the current picture to be coded by the coding unit 104. In such a case also, an average vector and vector variance can be computed with the same approach.

Next, the following shall describe how an average vector and vector variance are computed from coding information.

Figure 5:
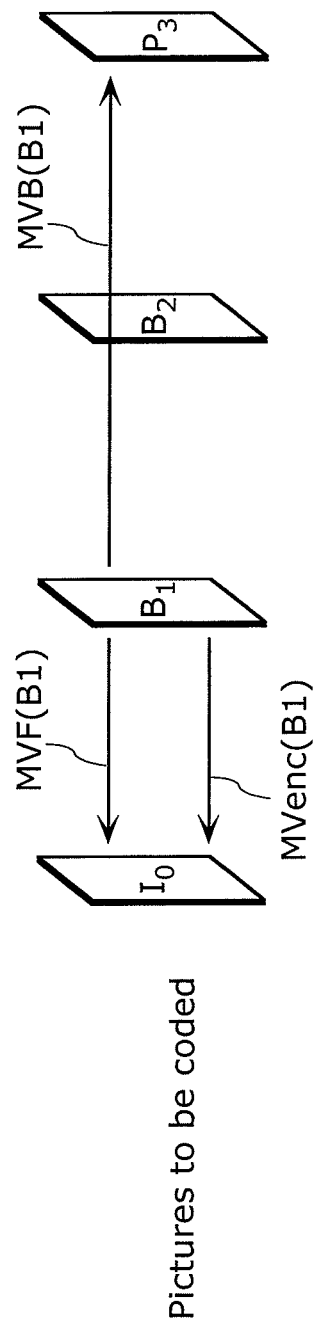
FIG. 5 is a diagram for describing how an average vector and vector variance are computed from coding information according to Embodiment 1 of the present invention.

FIG. 5 is a diagram for describing how an average vector and vector variance are computed from coding information. FIG. 5 shows a case where the coding unit 104 codes frame-structured pictures decoded by the decoding unit 102, and a B2 picture is the current picture to be coded by the coding unit 104. Under the H.264 standard, it is possible to refer to a P picture preceding an I picture. However, in order to simplify the description, the following shall describe a case where only an I picture and a P picture that are immediately preceding and immediately following the current picture are referred to, as in the MPEG-2 standard. When the current to-be-coded B2 picture is coded, a B1 picture is the picture coded immediately preceding the B2 picture according to the coding order.

In FIG. 5, there are two pictures that the B1 picture can refer to, namely, an I0 picture and a P3 picture. There are motion vectors MVF (B1) going from the B1 picture to the I0 picture, and motion vectors MVB (B1) going from the B1 picture to the P3 picture.

The MVF (B1) and MVB (B1), that is, the motion vectors of the B1 picture each corresponding to a macroblock, are time-scaled into motion vectors to be obtained when a frame immediately preceding the B1 picture is referred to. In other words, the motion vectors, to be obtained when the frame immediately preceding the B1 picture is referred to, are treated as MVenc (B1), and the MVenc (B1) are expressed using the motion vectors MVF (B1) going from the B1 picture to the I0 picture and using the motion vectors MVB (B1) going from the B1 picture to the P3 picture. The relational expression is as follows:

$$MVenc(B1)=MVF(B1)$$

$$MVenc(B1)=-\tfrac{1}{2}\times MVB(B1)$$

The average vector and vector variance can be expressed as follows, using the time-scaled motion vectors MVenc (B1).

$$AveMVenc(B1)=\Sigma MVenc(B1)/\text{number of vectors}$$

$$VarMVenc(B1)=(\Sigma MVenc(B1)\char`\^2)/\text{number of vectors}- AveMVenc(B1)\char`\^2$$

It is assumed here to use motion vector information of the picture coded immediately preceding the current to-be-coded B2 picture (the B1 picture).

Further, AveMVenc (B1) is the average vector, computed by the average vector computing unit 1053 shown in FIG. 3, of motion vectors each of which corresponds to a macroblock and is obtained from the coding information.

Further, the VarMVenc (B1) is vector variance, computed by the vector variance computing unit 1054 shown in FIG. 3, of the motion vectors each of which corresponds to a macroblock and is obtained from the coding information.

When pictures are coded in the display order shown in FIG. 5, the coding order is I0, P3, B1, B2, P6, B4, B5 . . . . The example set forth above assumes that the B1 picture uses the motion vectors of the P3 picture, and that a P6 picture uses the motion vectors of the B2 picture.

It is to be noted that as a method alternative to that shown in the present Embodiment 1, it is possible to use motion vector information of a picture which is of the same picture type as the current picture and which has been coded immediately preceding the current picture.

The average vector with a vector variance value smaller than those computed as described above, is selected to be treated as MVsel (B2). The MVsel (B2) is outputted as the basic motion information. More specifically, the comparing unit 1055 makes a comparison between the vector variance value VarMVdec (B2) provided by the vector variance computing unit 1052 and the vector variance value VarMVenc (B1) provided by the vector variance computing unit 1054. Based on a predetermined selection criterion that the vector corresponding to a smaller vector variance value is selected, the selector 1056 selects either the average vector corresponding to the vector variance value VarMVdec (B2) computed by the vector variance computing unit 1052 or the average vector corresponding to the vector variance value VarMVenc (B1) computed by the vector variance computing unit 1054, whichever average vector corresponding to a smaller vector variance value. The average vector selected by the selector 1056, that is, either the average vector AveMVdec (B2) derived from the decoding information or the average vector AveMVenc (B1) derived from the coding information, is provided to the coding unit 104 as the basic motion information MVsel (B2).

Figure 6:
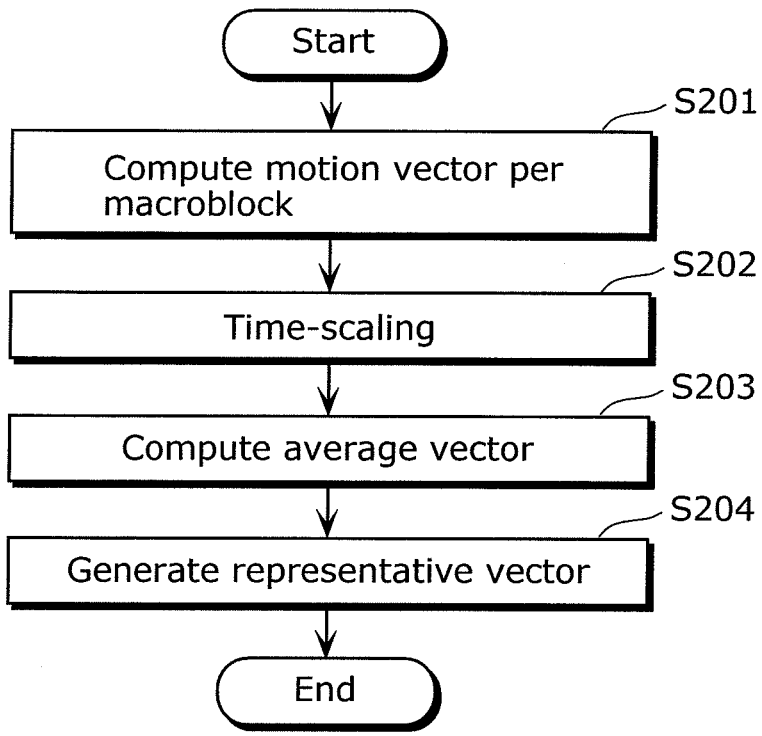
FIG. 6 is a flow chart for describing a process performed by a basic motion information generating unit according to Embodiment 1 of the present invention for generating a representative vector.

FIG. 6 is a flow chart for describing a process performed by the basic motion information generating unit 105 for generating a representative vector.

Here, the following shall describe a case where the average vector computing unit 1051 generates a representative vector.

At first, the average vector computing unit 1051 computes motion vectors each corresponding to a macroblock, from the decoding information provided by the decoding information holding unit 103 (S201).

Next, the average vector computing unit 1051 time-scales the current to-be-coded picture's motion vectors, each corresponding to a macroblock, into motion vectors each of which corresponds to a macroblock and is to be obtained when the current picture refers to a predetermined reference picture (S202).

Next, the average vector computing unit 1051 computes the average vector of the current to-be-coded picture's motion vectors, using the time-scaled motion vectors (S203).

Next, the average vector computing unit 1051 generates a representative vector by treating the computed average vector as a representative vector derived from the decoding information (S204).

It is to be noted that the average vector computing unit 1053 generates a representative vector in the same manner and thus the description thereof shall be omitted.

Figure 7:
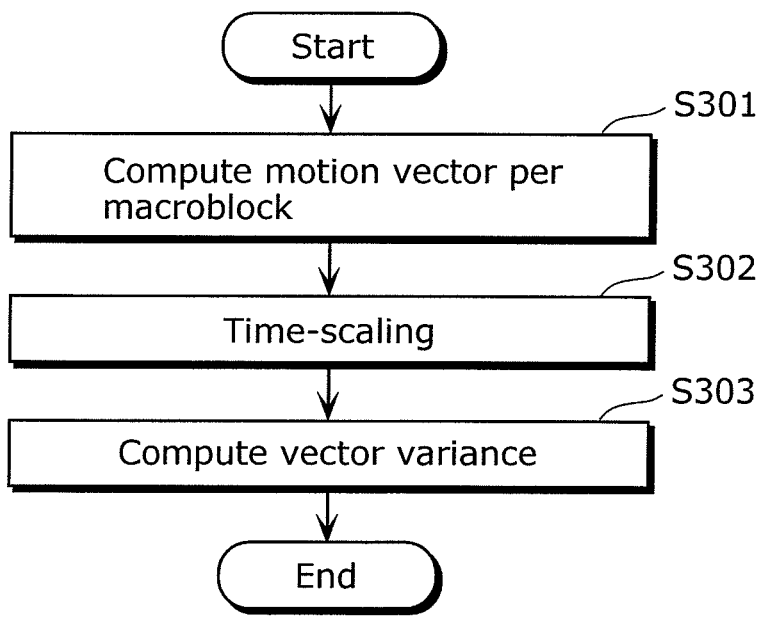
FIG. 7 is a flow chart for describing a process performed by a basic motion information generating unit according to Embodiment 1 of the present invention for computing vector variance.

FIG. 7 is a flow chart for describing a process performed by the basic motion information generating unit 105 for computing vector variance.

Here, the following shall describe a case where the vector variance computing unit 1052 computes vector variance.

At first, the vector variance computing unit 1052 computes motion vectors, each of which corresponds to a macroblock, from decoding information provided by the decoding information holding unit 103 (S301).

Next, the vector variance computing unit 1052 time-scales the current to-be-coded picture's motion vectors, each corresponding to a macroblock, into motion vectors each of which corresponds to a macroblock and is to be obtained when the current picture refers to a predetermined reference picture (S302).

Next, the vector variance computing unit 1052 computes vector variance of the current to-be-coded picture's motion vectors, using the time-scaled motion vectors (S303).

It is to be noted that the vector variance computing unit 1054 computes vector variance in the same manner and thus the description thereof shall be omitted.

Next, the following shall describe how the coding unit 104 determines a search range.

Figure 8:
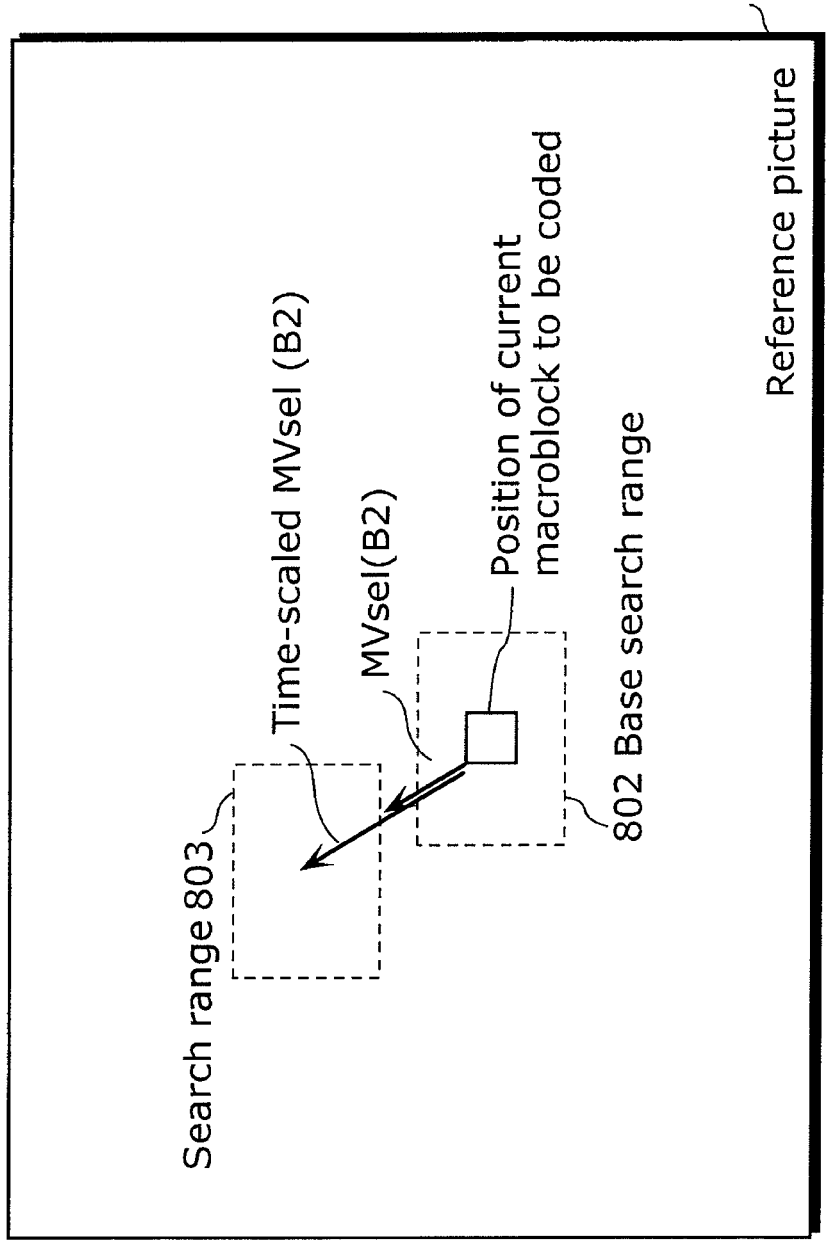
FIG. 8 is a diagram for describing how a search range is determined using basic motion information according to Embodiment 1 of the present invention.

FIG. 8 is a diagram for describing how a search range is determined using basic motion information.

Using MVsel (B2), that is, the basic motion information provided by the basic motion information generating unit 105, the coding unit 104 time-scales the current picture to be coded into a reference picture, and determines the center of a search range for each reference picture. The search range, serving as a base for motion vector estimation performed for each macroblock of the current picture to be coded, is a base search range 802 in a reference picture 801 in FIG. 8, surrounded by a dotted line. The motion vector estimation is performed with a new search range, i.e. the base search range 802 shifted by MVsel (B2) through the time-scaling from the current picture to be coded into the reference picture 801. The new search range is shown as a search range 803 surrounded by a dotted line in FIG. 8.

In the present Embodiment 1, the area of the search range, in which the motion vector estimation is carried out, is constant, and the only change made is in the center position. It is to be noted, however, that the search range for the motion vector estimation may be enlarged when the time-scaled basic motion information MVsel (B2) has a large value, to perform further thinned-out search, for example.

As set forth above, the present Embodiment 1 has described the case where the basic motion information generating unit 105 outputs a single vector as the basic motion information. The basic motion information is a representative vector selected by the selector 1056, namely, either the representative vector computed from the decoding information by the average vector computing unit 1051 or the representative vector computed from the coding information by the average vector computing unit 1053. Further, the vector variance serves as the criterion for selecting either the representative vector (average vector) computed from the decoding information by the average vector computing unit 1051 or the representative vector (average vector) computed from the coding information by the average vector computing unit 1053.

As a result, when estimating motion vectors, a comparison is made between the representative vector derived from the decoding information of an input stream and the representative vector derived from the coding information which was used for coding the previous picture, and then, one of these representative vectors is selected to be used as the basic motion information, which enables effective determination of a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

It is to be noted that the criterion for selection of a representative vector may be: the degree of match between an average of sums of absolute values of vectors and an average value; a dynamic range of vectors; or a value of residual component and so on at a macroblock level. In such a case, in order to enable the comparing unit 1055 to make a comparison based on such a criterion, the vector variance computing units 1052 and 1054 may be replaced with average-of-sum-of-absolute-values-of-vectors computing units that each compute an average of sums of absolute values of vectors and an average value, computing units that each compute a dynamic range of vectors, or the like.

In the present Embodiment 1, as the representative vector derived from the decoding information and as the representative vector derived from the coding information, the average of all the time-scaled motion vectors, each corresponding to a macroblock, is computed. It is to be noted, however, that average vectors and vector variance of the average vectors may be computed for each reference picture to select average vectors having a smaller variance value. Alternatively, an average vector representing a greater number of motion vectors may be selected.

Further, although vector variance values are used for selecting either the average vector derived from the decoding information or the average vector derived from the coding information, the average vector derived from the decoding information may be selected through the following process: hold evaluation values concerning the motion vector estimation performed by the coding unit 104 on each macroblock; compute a sum of the evaluation values corresponding to a single frame; and judge that the accuracy of the motion vector estimation is low when the computed sum exceeds a threshold value. The average vector derived from the coding information may be selected when the computed sum corresponding to a single frame is equal to or less than the threshold value.

(Embodiment 2)

Hereinafter, Embodiment 2 of the present invention shall be described with reference to the drawings.

Embodiment 1 has shown the case where the basic motion information generating unit 105 outputs a single vector as basic motion information, and where the first coded data and the second coded data both have a frame structure. The present Embodiment 2 shall still describe the case where the basic motion information generating unit 105 outputs a single vector as basic motion information, but the first coded data and the second coded data both have a field structure.

Figure 9:
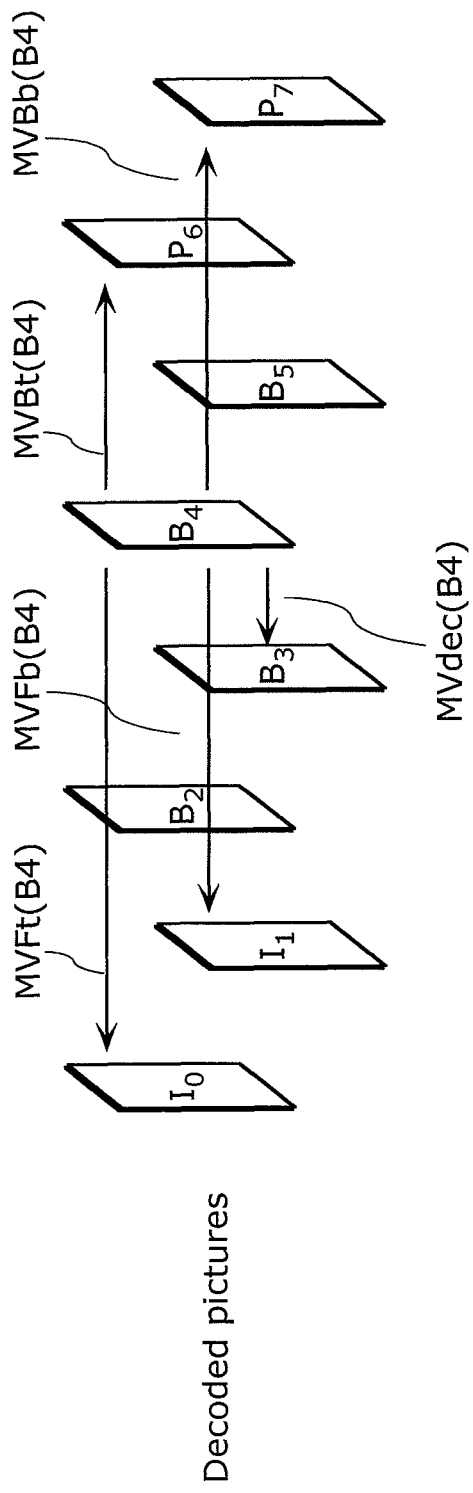
FIG. 9 is a diagram for describing how an average vector and vector variance are computed from decoding information according to Embodiment 2 of the present invention.

FIG. 9 is a diagram for describing how an average vector and vector variance are computed from the decoding information. FIG. 9 shows a case where the decoded first coded data is coded in a field structure, and a B4 field is the current picture to be coded by the coding unit 104.

In FIG. 9, the B4 field can refer to four fields, since the reference pictures all have a field structure. More specifically, in the case of forward reference, the B4 field refers to an I0 field and an I1 field, and thus, there are motion vectors MVFt (B4) going from the B4 field to the I0 field and motion vectors MVFb (B4) going from the B4 field to the I1 field. In the case of backward reference, the B4 field refers to a P6 field and a P7 field, and thus, there are motion vectors MVBt (B4) going from the B4 field to the P6 field and motion vectors MVBb (B4) going from the B4 field to the P7 field. Such motion vectors each of which corresponds to a macroblock are time-scaled into motion vectors which are to be obtained when the B4 field refers to an immediately preceding field. The relational expression of MVdec (B4), which are the motion vectors to be obtained when the B4 field refers to the immediately preceding field, is as follows.

$$MVdec(B4) = \tfrac{1}{4} \times MVFt(B4)$$

$$MVdec(B4) = \tfrac{1}{3} \times MVFb(B4)$$

$$MVdec(B4) = -\tfrac{1}{2} \times MVBt(B4)$$

$$MVdec(B4) = -\tfrac{1}{3} \times MVBb(B4)$$

The average and variance of the vectors can be expressed as follows using the time-scaled motion vectors MVdec (B4), as in the case of the frame structure shown in Embodiment 1.

$$AveMVdec(B4) = \Sigma MVdec(B4)/\text{number of vectors}$$

$$VarMVdec(B4) = (\Sigma MVdec(B4)^2)/\text{number of vectors} - AveMVdec(B4)^2$$

Figure 10:
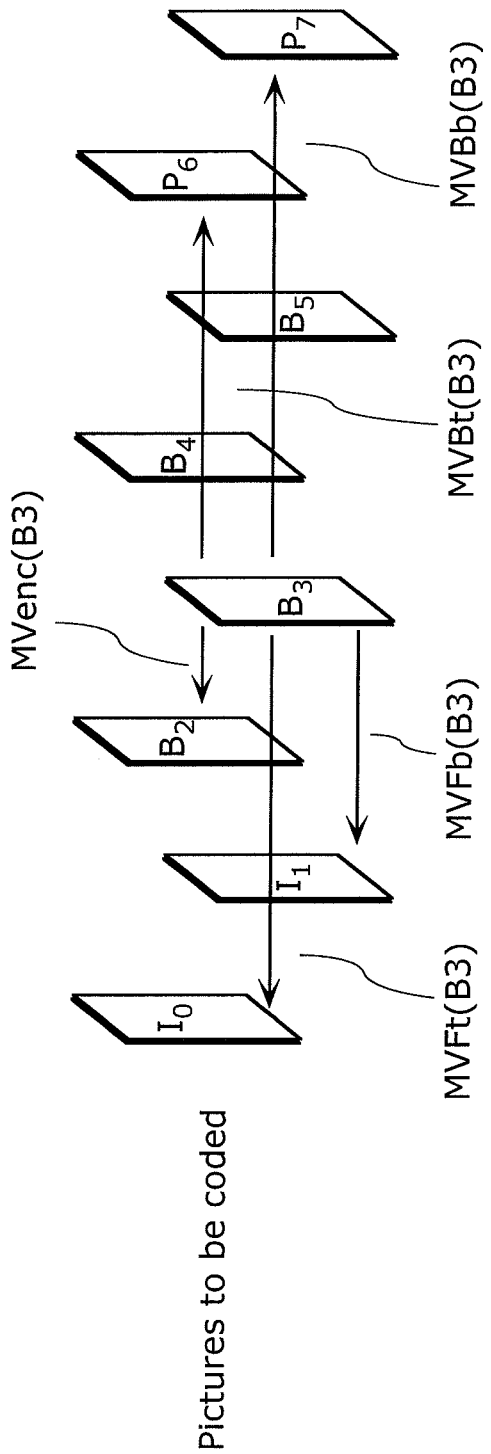
FIG. 10 is a diagram for describing how an average vector and vector variance are computed from coding information according to Embodiment 2 of the present invention.

FIG. 10 is a diagram for describing how an average vector and vector variance are computed from coding information. FIG. 10 shows a case where the coding unit 104 codes a field-structured picture decoded by the decoding unit 102, and where a B4 field is the current picture to be coded by the coding unit 104. Under the H.264 standard, it is possible to refer to a P picture preceding an I picture. However, in order to simplify the description, the following shall describe a case where only an I picture and a P picture that are immediately preceding and immediately following the current picture are referred to, as in the MPEG-2 standard. When the current to-be-coded B4 field is coded, it is the B3 field that was coded immediately preceding the B4 field according to the coding order.

FIG. 10 shows the pictures that the B3 field can refer to. In the case of forward reference, the B3 field refers to an I0 field and an I1 field, and thus, there are motion vectors MVFt (B3) going from the B3 field to the I0 field and motion vectors MVFb (B3) going from the B3 field to the I1 field. In the case of backward reference, the B3 field refers to a P6 field and a P7 field, and thus, there are motion vectors MVBt (B3) going from the B3 field to the P6 field and motion vectors MVBb (B3) going from the B3 field to the P7 field. Such motion vectors, each of which corresponds to a macroblock, are time-scaled into motion vectors which are to be obtained when the B3 field refers to an immediately preceding field. The relational expression of MVenc (B3), which are the motion vectors to be obtained when the B4 field refers to the immediately preceding field, is as follows.

$$MVenc(B3) = \tfrac{1}{3} \times MVFt(B3)$$

$$MVenc(B3) = \tfrac{1}{2} \times MVFb(B3)$$

$$MVenc(B3) = -\tfrac{1}{3} \times MVBt(B3)$$

$$MVenc(B3) = -\tfrac{1}{4} \times MVBb(B3)$$

The average and variance of the vectors can be expressed as follows using the time-scaled motion vectors MVenc (B3).

$$AveMVenc(B3) = \Sigma MVenc(B3)/\text{number of vectors}$$

$$VarMVenc(B3) = (\Sigma MVenc(B3)^\wedge 2)/\text{number of vectors} - AveMVenc(B3)^\wedge 2$$

It is assumed here to use the motion vector information of the picture coded immediately preceding the current to-be-coded B4 picture.

When the pictures are coded in the display order shown in FIG. 10, the coding order is I0, I1, P6, P7, B2, B3, B4, B5, P12, P13 . . . . The example set forth above assumes that the B2 field uses the motion vectors of the P7 field, and that the P12 field uses the motion vectors of the B5 field.

It is to be noted that as a method alternative to that shown in the present Embodiment 2, it is possible to use motion vector information of a picture which is of the same picture type as the current picture and has been coded immediately preceding the current picture. Another method may be to use motion vector information of a picture which is of the same picture type and of the same parity as the current picture and has been coded immediately preceding the current picture.

Next, the following shall describe how the coding unit 104 determines a search range.

Based on the vector variances computed in the above described manner, the basic motion information generating unit 105 selects the average vector having a smaller vector variance value and provides it to the coding unit 104 as basic motion information MVsel (B4).

Using the basic motion information MVsel (B4) provided by the basic motion information generating unit 105, the coding unit 104 time-scales the current picture to be coded into a reference picture, and determines the center of a search range for each reference picture.

In the present Embodiment 2, the area of the search range is constant, and the only change made is in the center position. It is to be noted, however, that the search range may be enlarged when the time-scaled basic motion information MVsel (B4) has a large value, for further thinned-out search, for example.

As described, the present Embodiment 2 has shown that even when the current decoded picture to be coded has the field structure, a comparison is made between a representative vector computed from the decoding information of an input stream or a representative vector computed from the coding information used when the previous picture was coded, and one of them is selected to be used for effectively determining a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

In the present Embodiment 2, as the representative vector derived from the decoding information and as the representative vector derived from the coding information, the average of all the time-scaled motion vectors, each corresponding to a macroblock, is computed. It is to be noted, however, that average vectors and vector variance of the average vectors may be computed for each reference picture to select average vectors having a smaller variance value. Alternatively, an average vector representing a greater number of motion vectors may be selected.

Further, although the vector variance value is used for selecting either the average vector derived from the decoding information or the average vector derived from the coding information, the average vector derived from the decoding information may be selected through the following process: hold evaluation values concerning the motion vector estimation performed by the coding unit 104 on each macroblock; compute a sum of the evaluation values corresponding to a single frame; and judge that the accuracy of the motion vector estimation is low when the computed sum exceeds a threshold value. The average vector derived from the coding information may be selected when the computed sum corresponding to a single frame is equal to or less than the threshold value.

(Embodiment 3)

The following shall describe Embodiment 3 of the present invention.

Embodiment 2 has shown the case where the basic motion information generating unit 105 outputs a single vector as basic motion information, and where the first coded data and the second coded data both have a field structure. The present Embodiment 3 shall still describe the case where the basic motion information generating unit 105 outputs a single vector as basic motion information, but the first coded data has a different coding structure from that of the second coded data.

When the first coded data has a frame structure whereas the second coded data has a field structure, the representative vector derived from the decoding information can be obtained by computing an average vector by the method shown in Embodiment 1, and the representative vector derived from the coding information can be obtained by computing an average vector by the method shown in Embodiment 2. To be more specific, the representative vector derived from the decoding information is equivalent to the motion vector of the current picture to be coded which is obtained when a frame immediately preceding the current picture is referred to and is the average vector of the current picture computed through time-scaling. Multiplying this average vector by ½ derives the motion vector of the current field to be coded which is the motion vector to be obtained when a field immediately preceding the current field is referred to.

Further, when the first coded data has a field structure whereas the second coded data has a frame structure, the representative vector derived from the decoding information can be obtained by computing an average vector by the method shown in Embodiment 2, and the representative vector derived from the coding information can be obtained by computing an average vector by the method shown in Embodiment 1. To be more specific, the representative vector derived from the decoding information is equivalent to the motion vector of the current field to be coded which is the motion vector to be obtained when a field immediately preceding the current field is referred to and is the average vector of the current field computed through time-scaling. Multiplying this average vector by 2 derives the motion vector of the current picture to be coded which is the motion vector to be obtained when a frame immediately preceding the current picture is referred to.

As described above, the present Embodiment 3 has shown that even when the first coded data has a field structure and the second coded data has a frame structure or vice versa, at the time of motion vector estimation, a comparison is made between a representative vector derived from the decoding information of an input stream or a representative vector derived from the coding information used when the previous picture was coded, and one of them is selected to be used for effectively determining a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

The present Embodiment 3 uses vector variance values for selecting either the average vector derived from the decoding information or the average vector derived from the coding information. It is to be noted, however, that the average vector derived from the decoding information may be selected through the following process: hold evaluation values concerning the motion vector estimation performed by the coding unit 104 on each macroblock; compute a sum of the evaluation values corresponding to a single field or frame; and judge that the accuracy of the motion vector estimation is low when the computed sum exceeds a threshold value. The average vector derived from the coding information may be selected when the computed sum corresponding to a single field or frame is equal to or less than the threshold value.

(Embodiment 4)

The following shall describe Embodiment 4 of the present invention.

Embodiment 3 has shown the case where the basic motion information generating unit 105 outputs a single vector as basic motion information, and where the first coded data has a different coding structure from that of the second coded data. Embodiment 4 shall show a case where the basic motion information generating unit 105 outputs a representative vector for each reference direction as basic motion information. The case here is that the first coded data and the second coded data both have a frame structure as their coding structure.

The representative vector derived from the decoding information and the representative vector derived from the coding information can be computed by the method shown in Embodiment 1.

As in S201 of FIG. 6, the average vector computing unit 1051 of the basic motion information generating unit 105 computes motion vectors, each corresponding to a macroblock, from decoding information.

Next, the average vector computing unit 1051 of the basic motion information generating unit 105 performs an operation on the above computed motion vectors for each reference direction to perform time-scaling.

Next, as in S202 of FIG. 6, the average vector computing unit 1051 of the basic motion information generating unit 105 time-scales the motion vectors, on which an operation has been performed for each reference direction, into motion vectors of the respective reference directions which are to be obtained when the current picture refers to each of predetermined reference pictures.

Next, as in S202 of FIG. 6, the average vector computing unit 1051 of the basic motion information generating unit 105 computes, for each reference direction, an average vector of the current picture to be coded, using the motion vectors time-scaled for each reference direction.

Moreover, as described above and shown in FIG. 7, vector variance is also computed for each reference direction.

Based on the vector variance, the basic motion information generating unit 105 selects, for each reference direction, either the representative vector (average vector) computed from the decoding information or the representative vector (average vector) computed from the coding information. Then, the basic motion information generating unit 105 provides the representative vectors selected for respective reference directions to the coding unit 104 as basic motion information.

As shown above, in the present Embodiment 4, the basic motion information generating unit 105 generates a representative vector for each reference direction as basic motion information. When estimating motion vectors, a comparison is made between the representative vector derived from the decoding information of an input stream and the representative vector derived from the coding information which was used for coding the previous picture, and then, one of these representative vectors is selected to be used for effectively determining a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

The present Embodiment 4 has shown the case of computing, for each reference direction, an average vector of motion vectors derived from the decoding information and an average vector of motion vectors derived from coding information. It is to be noted, however, that the average vectors may be computed for each reference picture. Furthermore, when some reference pictures in a reference direction have a greater number of motion vectors than others in the reference direction, the average vector of the reference picture having the greatest number of vectors may be treated as the representative of the reference direction.

Moreover, even when the first coded data and the second coded data both have a field structure as their coding structure, a representative vector derived from the decoding information and a representative vector derived from the coding information may be computed for each reference direction by the method shown in Embodiment 2.

Furthermore, when the first coded data has a different coding structure from that of the second coded data, a representative vector derived from the decoding information and a representative vector derived from the coding information may be computed for each reference direction by the method shown in Embodiment 3.

The present Embodiment 4 uses vector variance values for selecting either the average vector derived from the decoding information or the average vector derived from the coding information. It is to be noted, however, that the average vector derived from the decoding information may be selected through the following process: hold evaluation values concerning the motion vector estimation performed by the coding unit 104 on each macroblock; compute a sum of the evaluation values corresponding to a single frame; and judge that the accuracy of the motion vector estimation is low when the computed sum exceeds a threshold value. The average vector derived from the coding information may be selected when the computed sum corresponding to a single frame is equal to or less than the threshold value.

(Embodiment 5)

The following shall describe Embodiment 5 of the present invention.

Embodiment 4 has shown the case where the basic motion information generating unit 105 outputs a representative vector for each reference direction as basic motion information. In the present Embodiment 5, the basic motion information generating unit 105 divides each picture into a plurality of areas, and computes a representative vector for each of the areas, and then outputs the computed representative vectors as basic motion information. The basic motion information generating unit 105 here outputs a plurality of vectors.

The case here is that the first coded data and the second coded data both have a frame structure as their coding structure.

Further, the exemplary case described here is that each picture is divided into four areas horizontally, and four areas vertically (hereinafter the picture is referred to as divided frame).

Figure 11:
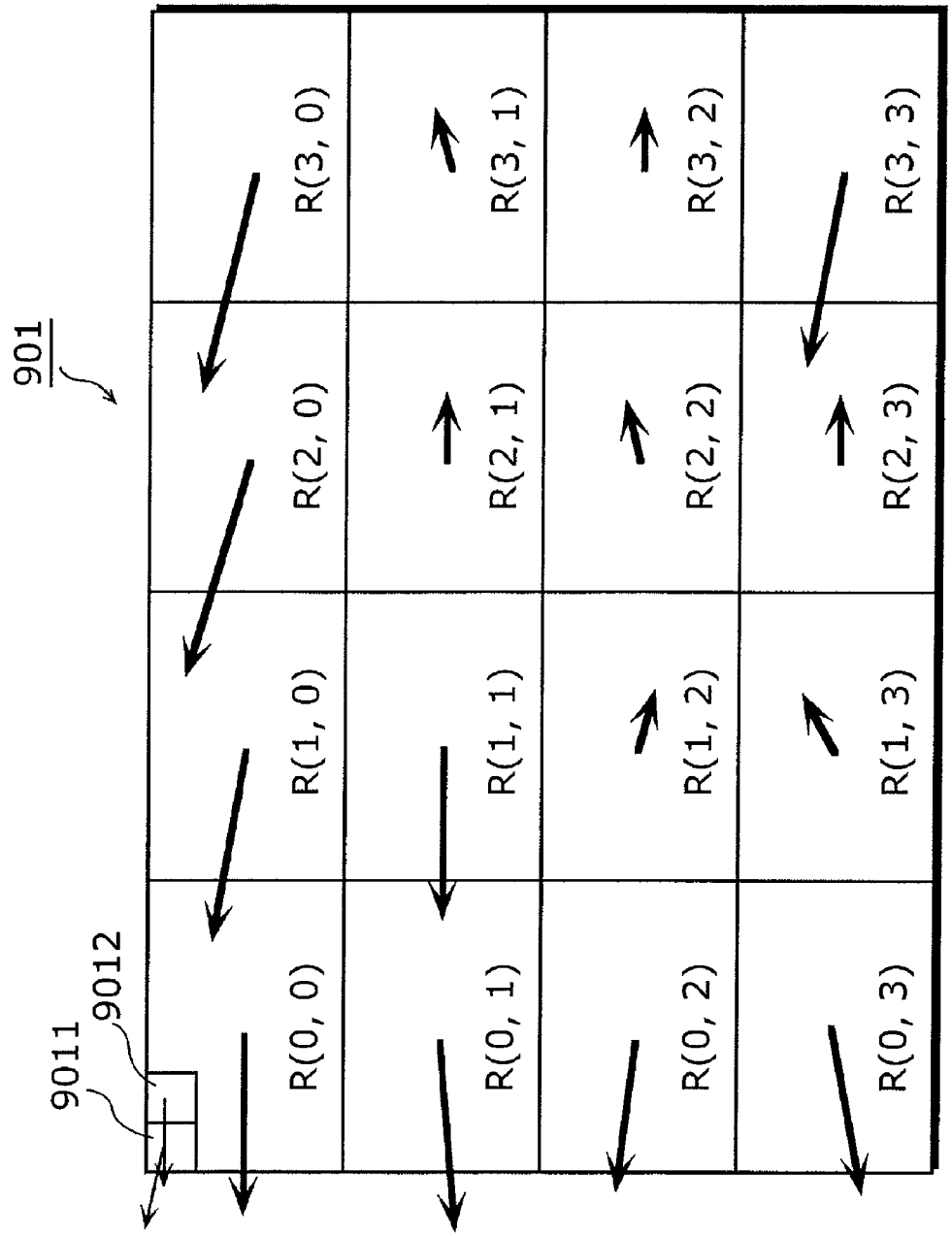
FIG. 11 is a diagram for describing representative vectors each of which corresponds to one of areas of a divided frame according to Embodiment 5 of the present invention.

FIG. 11 is a diagram for describing the case where a representative vector is computed for each area of a divided frame 901. Small rectangular areas shown at the top left of FIG. 11 represent macroblocks which are called a macroblock 9011 and a macroblock 9012 as examples.

Arrows shown at the macroblock 9011 and the macroblock 9012 of FIG. 11 represent motion vectors of the respective macroblocks of the current picture to be coded by the coding unit 104, in the case where the motion vectors of the current picture to be coded have been time-scaled into motion vectors which are to be obtained when a frame immediately preceding the current picture is referred to.

Further, each area shown in FIG. 11 with R (x, y) (where x and y are both an integer between 0 and 3 inclusive) represents an area of the divided frame 901. An operation is performed on the motion vectors of each of the areas, the motion vectors each corresponding to a macroblock. Then an average vector is computed for each area. For each area, an average vector from the decoding information and an average vector from the coding information are computed, and it is determined for each area which average vector, computed from either the decoding information or the coding information, is to be a representative vector of the area, using an evaluation value, such as vector variance. Then, the basic motion information generating unit 105 outputs sixteen representative vectors, each selected for one of the areas, as basic motion information.

Figure 12:
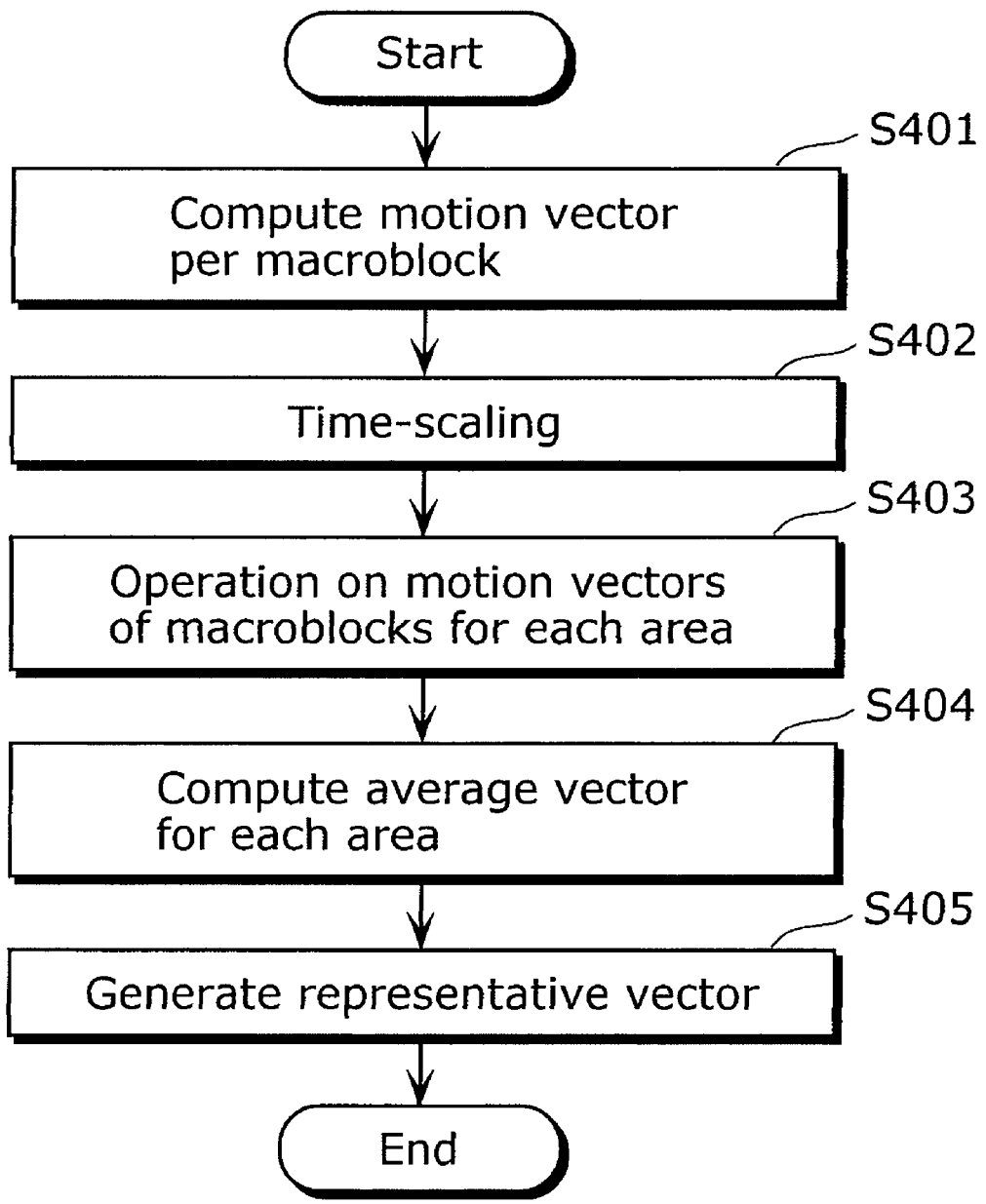
FIG. 12 is a flow chart for describing a process performed by a basic motion information generating unit according to Embodiment 5 of the present invention for generating a representative vector for each area of a divided frame.

FIG. 12 is a flow chart for describing a process performed by the basic motion information generating unit 105 for generating a representative vector for each area of the divided frame 901.

Here, the following shall describe a case where the average vector computing unit 1051 generates a representative vector for each area of the divided frame 901.

At first, the average vector computing unit 1051 computes motion vectors each corresponding to a macroblock, from the decoding information provided by the decoding information holding unit 103 (S401).

Next, the average vector computing unit 1051 time-scales the current to-be-coded picture's motion vectors, each corresponding to a macroblock, into motion vectors each of which corresponds to a macroblock and is to be obtained when the current picture refers to is a predetermined reference picture (S402).

Next, for each area of the divided frame 901, the average vector computing unit 1051 performs an operation on the current to-be-coded picture's motion vectors each of which corresponds to a macroblock and has been time-scaled (S403).

Next, the average vector computing unit 1051 computes an average vector for each area of the divided frame 901, using the current to-be-coded picture's motion vectors which have been time-scaled and on which the above operation has been performed for each area (S404).

Next, the average vector computing unit 1051 generates a representative vector for each area by treating the average vector computed for a corresponding area as a representative vector, derived from the decoding information, of the corresponding area (S404).

It is to be noted that the average vector computing unit 1053 generates a representative vector for each area in the same manner, and thus the description thereof shall be omitted.

Figure 13:
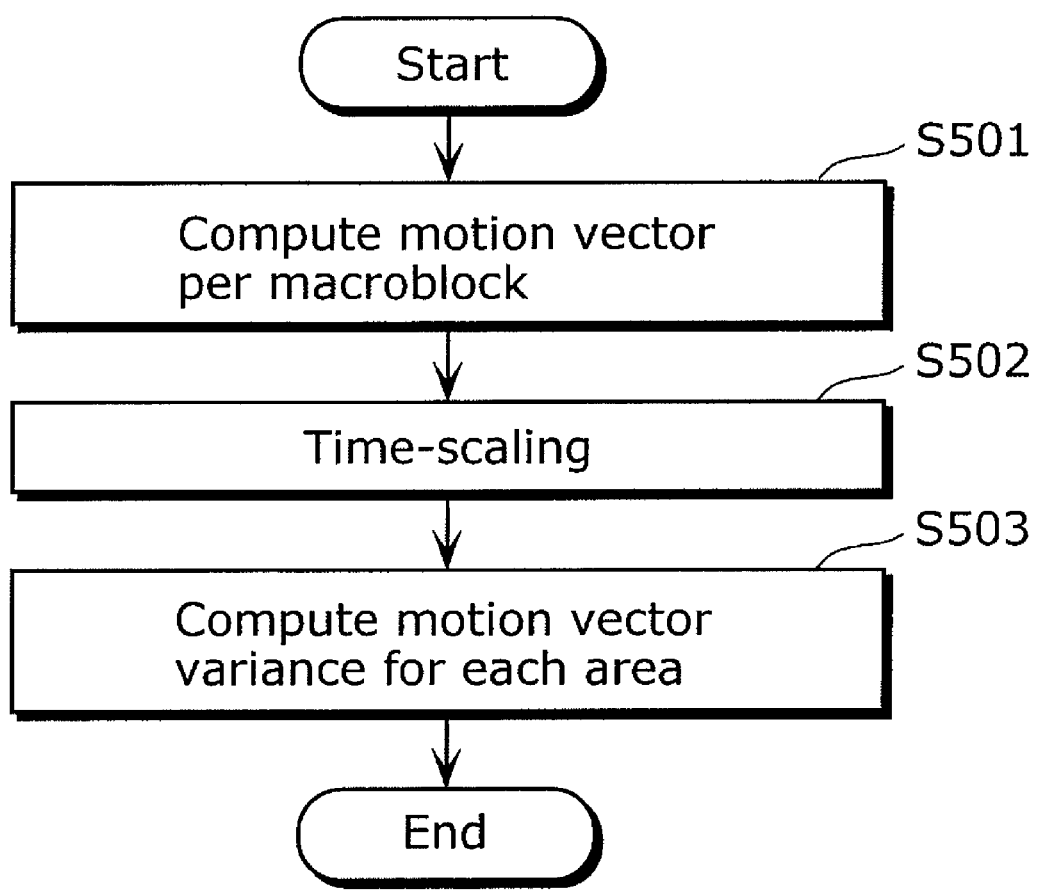
FIG. 13 is a flow chart for describing a process performed by a basic motion information generating unit according to Embodiment 5 of the present invention for computing vector variance for each area of a divided frame.

FIG. 13 is a flow chart for describing a process performed by the basic motion information generating unit 105 for computing vector variance for each area of the divided frame 901.

Here, the following shall describe a case where the vector variance computing unit 1052 computes vector variance for each area of the divided frame 901.

At first, the vector variance computing unit 1052 computes motion vectors, each of which corresponds to a macroblock, from the decoding information provided by the decoding information holding unit 103 (S501).

Next, the vector variance computing unit 1052 time-scales the current to-be-coded picture's motion vectors, each corresponding to a macroblock, into motion vectors each of which corresponds to a macroblock and is to be obtained when the current picture refers to a predetermined reference picture (S502).

Next, for each area of the divided frame 901, the vector variance computing unit 1052 performs an operation on the motion vectors each of which corresponds to a macroblock and has been time-scaled.

Next, the vector variance computing unit 1052 computes vector variance for each area of the divided frame 901, using the current to-be-coded picture's motion vectors which have been time-scaled and on which the above operation has been performed on an area-by-area basis (S503).

It is to be noted that the vector variance computing unit 1054 computes vector variance for each area of the divided frame 901 in the same manner and thus the description thereof shall be omitted.

Next, the following shall describe how the coding unit 104 determines a search range.

The coding unit 104 changes a search range for motion vector estimation, depending on which of the sixteen areas of the divided frame 901 a current macroblock to be coded is in. For example, when assuming a macroblock in an area R (0, 0) is the current macroblock to be coded, motion vectors are estimated in the search range having its center positioned where the representative vector of the area R (0, 0) points at.

In this case, the center of the search range can be changed by changing the basic motion information MVsel (B2) for each area having a current macroblock to be coded, instead of by changing the basic motion information MVsel (B2) for each reference picture, as described with reference to FIG. 8.

As shown above, in the present Embodiment 5, the basic motion information generating unit 105 generates a representative vector for each area as basic motion information. When estimating motion vectors, a comparison is made between the representative vector derived for each area from the decoding information of an input stream and the representative vector derived for each area from the coding information which was used for coding the previous picture, and then, one of these representative vectors is selected to be used for effectively determining a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

The present embodiment has shown the case where the first coded data and the second coded data both have a frame structure as their coding structure. It is to be noted, however, that even in a case where the first coded data and the second coded data both have a field structure, or in a case where one has a frame structure and the other has a field structure, the method for computing a representative vector described in Embodiment 2 or 3 may be applied to the area-by-area based representative vector computation.

Furthermore, the present embodiment has shown the case where the basic motion information generating unit 105 generates, as basic motion information, a single representative vector for each area of the current picture to be coded. However, as described in Embodiment 4, a representative vector corresponding to one of the areas may be computed as basic motion information for each reference direction of the current picture to be coded.

In addition, the basic motion information generating unit 105 may group representative vectors, each corresponding to one of the areas of the current picture to be coded, by magnitude and direction, to generate one or more representative vectors as the basic motion information. For example, the vectors of the respective areas of the divided frame 901 in FIG. 11 may be classified into groups as follows: the representative vector of the area R (0, 0) may be classified into a group of left-pointing vectors with greater magnitudes; and the representative vector of the area R (2,1) may be classified into a group of right-pointing vectors with smaller magnitudes. The basic motion information generating unit 105 computes an average vector for each group, and treats a single representative vector as the basic motion information for each group. The basic motion information generating unit 105 may compute a median value, a maximum value or a minimum value of the motion vectors of each group instead of an average vector.

(Embodiment 6)

The following shall describe Embodiment 6 of the present invention.

Embodiment 5 has shown the case where a representative vector is computed for each of areas into which a frame is divided, as a method for the basic motion information generating unit 105 to perform an operation on motion vectors of respective macroblocks. The present Embodiment 6 shall describe a method of performing an operation on motion vectors of respective macroblocks by classifying the motion vectors of the respective macroblocks into groups by magnitude and direction, as a method for the basic motion information generating unit 105 to perform an operation on the motion vectors of the respective macroblocks.

Figure 14:
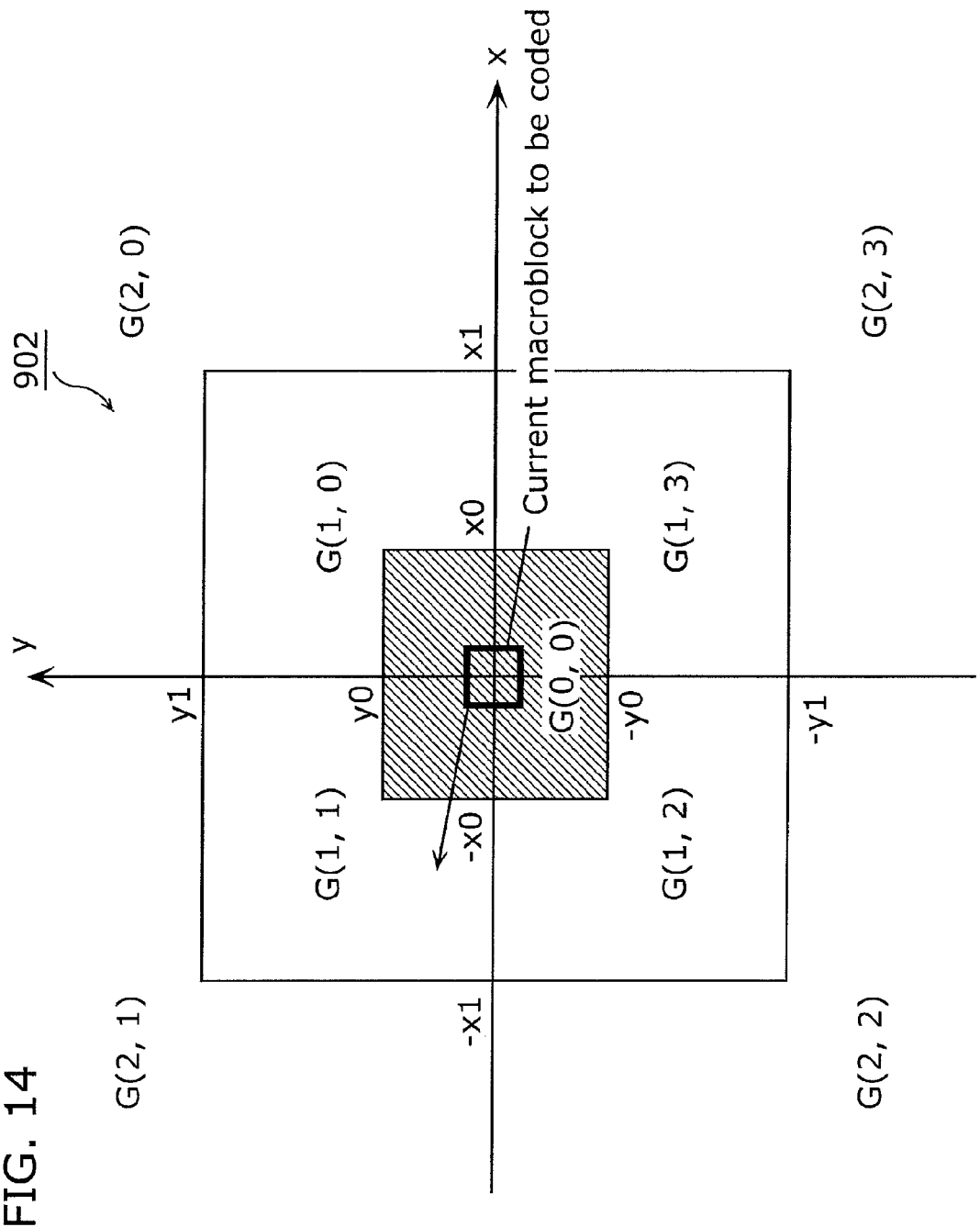
FIG. 14 is a diagram for describing a case of computing representative vectors each of which corresponds to one of sub-areas into which an area is divided according to magnitude and direction of motion vectors according to Embodiment 6 of the present invention.

FIG. 14 is a diagram for describing a case of computing representative vectors, each corresponding to one of sub-areas into which an area 902 is divided according to magnitude and direction of motion vectors.

The basic motion information generating unit 105 time-scales motion vectors, each of which corresponds to a macroblock and can be derived from either decoding information or coding information. Then, the basic motion information generating unit 105 examines the time-scaled motion vectors to see which of the sub-areas, into which the area 902 is divided according to magnitude and direction of motion vectors as shown in FIG. 14, each of the motion vectors is included in.

It is assumed here that a group consisting of motion vectors having magnitudes close to zero is in a sub-area indicated by G (0, 0). Further, a group positioned near the sub-area indicated by G (0, 0) and consisting of motion vectors having relatively small magnitudes is assumed to be in one of sub-areas G (1, 0) to G (1, 3) which are respectively in the first to fourth quadrants. Furthermore, a group consisting of motion vectors having greater magnitudes is assumed to be in one of sub-areas G (2, 0) to G (2, 3) which are respectively in the first to fourth quadrants. For example, any numbers can be given to x0, x1, y0, and y1, each being a boundary value of the sub-area G (1, 0) in the first quadrant of the area 902. For example, they may be that x0=y0=16, and x1=y1=48. FIG. 14 shows that the motion vector of the current macroblock to be coded is in the sub-area G (1, 1).

For each group of motion vectors classified by magnitude and direction, the basic motion information generating unit 105 performs an operation on the motion vectors which have been time-scaled on a macroblock-by-macroblock basis and computed from either the decoding information or the coding information. Then, the basic motion information generating unit 105 computes, for each group of motion vectors, an average vector from the motion vectors which have been derived from the decoding information and on which the above operation has been performed on a group-by-group basis, and an average vector from the motion vectors which have been derived from the coding information and on which the above operation has been performed on a group-by-group basis. Then, for each of nine groups of motion vectors classified by magnitude and direction, the basic motion information generating unit 105 selects either the average vector computed from the decoding information or the average vector computed from the coding information, as a representative vector. Then the basic motion information generating unit 105 provides nine representative vectors each selected for one of the nine groups of motion vectors classified by magnitude and direction, to the coding unit 104 as basic motion information.

Figure 15:
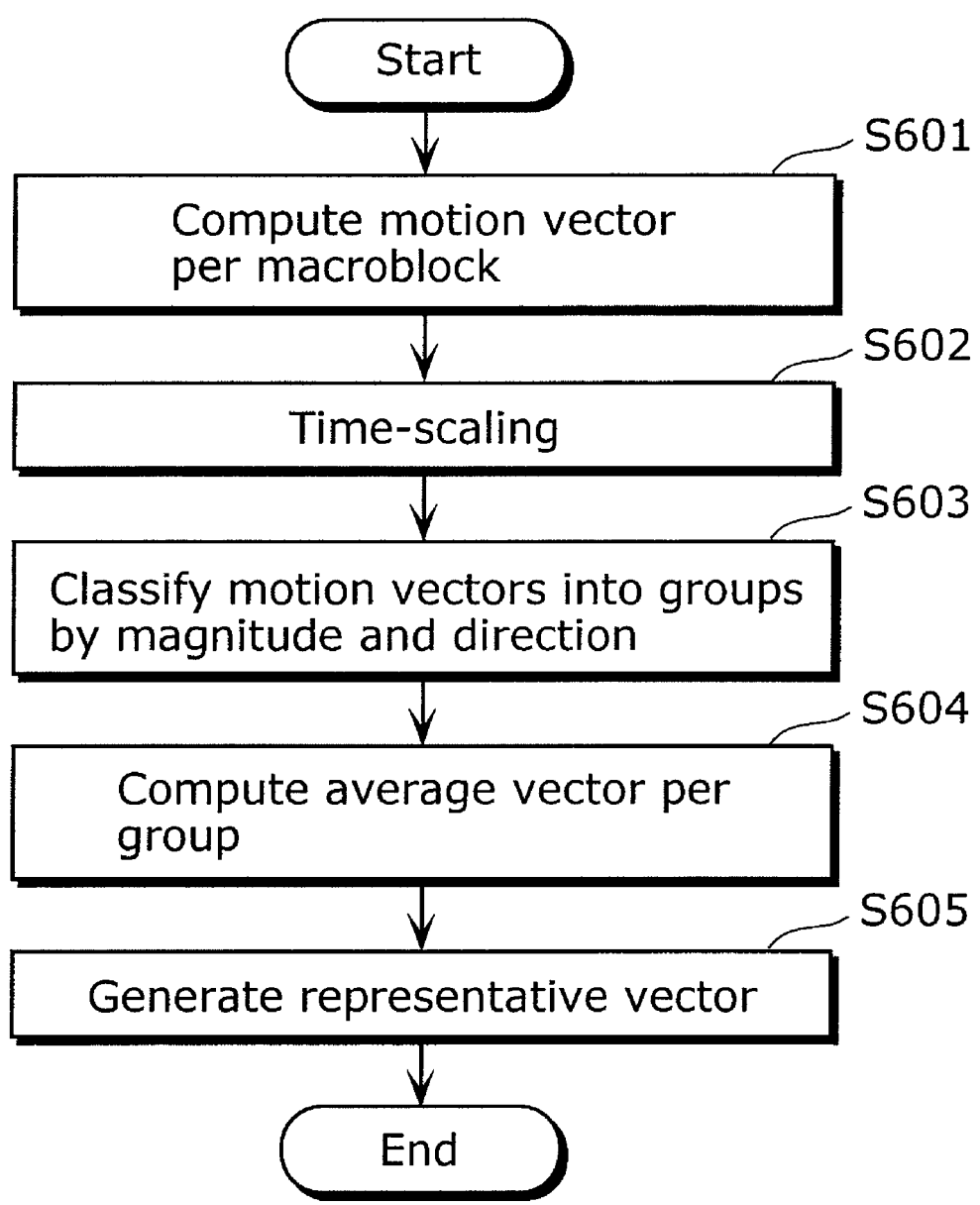
FIG. 15 is a flow chart for describing a process performed by a basic motion information generating unit according to Embodiment 6 of the present invention for generating a representative vector for each of sub-areas, into which an area is divided according to magnitude and direction of motion vectors.

FIG. 15 is a flow chart for describing a process performed by the basic motion information generating unit 105 for generating a representative vector for each of the sub-areas, into which the area 902 is divided according to magnitude and direction of motion vectors.

The following shall describe a case where the average vector computing unit 1051 generates a representative vector for each of the sub-areas.

At first, the average vector computing unit 1051 computes motion vectors, each of which corresponds to a macroblock, from the decoding information provided by the decoding information holding unit 103 (S601).

Next, the average vector computing unit 1051 time-scales the current to-be-coded picture's motion vectors, each corresponding to a macroblock, into motion vectors each of which corresponds to a macroblock and is to be obtained when the current picture refers to a predetermined reference picture (S602).

Next, for each of the sub-areas, the average vector computing unit 1051 performs an operation on the time-scaled motion vectors, each corresponding to a macroblock (S603).

Next, the average vector computing unit 1051 computes an average vector for each of the sub-areas, using the current to-be-coded picture's motion vectors which have been time-scaled and on which an operation has been performed on a sub-area-by-sub-area basis (S604).

Next, the average vector computing unit 1051 generates a representative vector for each sub-area by treating, for each sub-area, the computed average vector as a representative vector of the sub-area, derived from the decoding information (S605).

It is to be noted that the average vector computing unit 1053 generates a representative vector for each sub-area in the same manner, and thus the description thereof shall be omitted.

Figure 16:
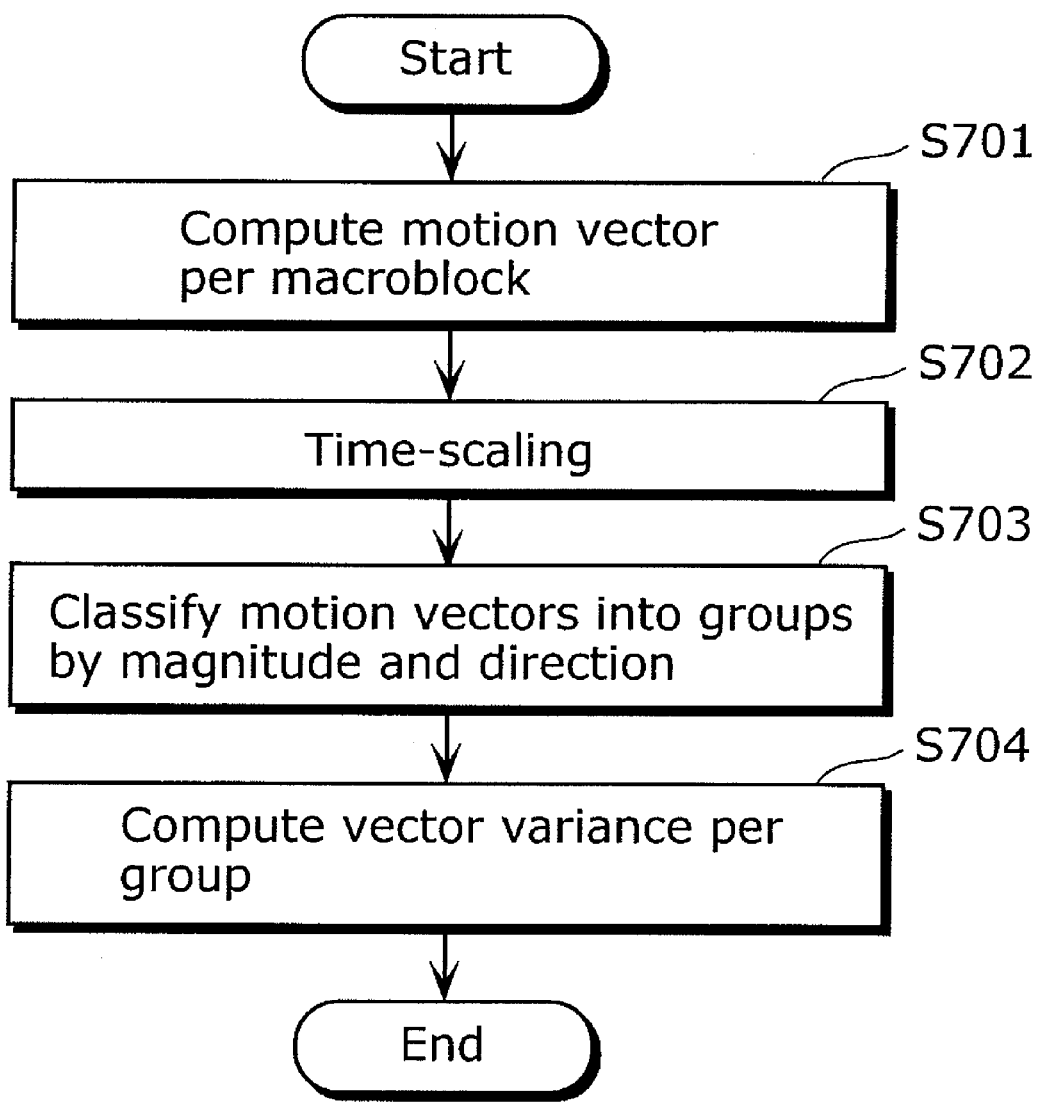
FIG. 16 is a flow chart for describing a process performed by a basic motion information generating unit according to Embodiment 6 of the present invention for computing vector variance for each of sub-areas, into which an area is divided according to magnitude and direction of motion vectors.

FIG. 16 is a flow chart for describing a process performed by the basic motion information generating unit 105 for computing vector variance for each of sub-areas into which the area 902 is divided according to magnitude and direction of motion vectors.

Here, the following shall describe a case where the vector variance computing unit 1052 computes vector variance for each of sub-areas into which the area 902 is divided according to magnitude and direction of motion vectors.

At first, the vector variance computing unit 1052 computes motion vectors, each of which corresponds to a macroblock, from the decoding information provided by the decoding information holding unit 103 (S701).

Next, the vector variance computing unit 1052 time-scales the current to-be-coded picture's motion vectors, each corresponding to a macroblock, into motion vectors each of which corresponds to a macroblock and is to be obtained when the current picture refers to a predetermined reference picture (S702).

Next, for each sub-area of the area 902, the vector variance computing unit 1052 performs an operation on the motion vectors each of which corresponds to a macroblock and has been time-scaled.

Next, the vector variance computing unit 1052 computes vector variance for each sub-area of the area 902, using the current to-be-coded picture's motion vectors which have been time-scaled and on which the above operation has been performed on a sub-area-by-sub-area basis (S703).

It is to be noted that the vector variance computing unit 1054 computes vector variance for each of sub-areas, into which the area 902 is divided according to magnitude and direction, in the same manner and thus the description thereof shall be omitted.

Next, the following shall describe how the coding unit 104 determines a search range.

The coding unit 104 performs motion vector estimation by searching nine search ranges per reference picture based on the nine representative vectors of the respective sub-areas into which the area 902 is divided. Alternately, the coding unit 104 performs motion vector estimation by, for example, searching a total of nine search ranges selected per reference picture.

The present Embodiment 6 is based on the assumption that the basic motion information generating unit 105 classifies motion vectors into groups and outputs all of the computed representative vectors as basic motion information. It is to be noted, however, that only the average vector of the group having the greatest number of motion vectors may be generated as the representative vector, for example. Further, the average vectors of the groups having the greatest and the second greatest numbers of motion vectors may be computed as representative vectors.

In addition, the basic motion information generating unit 105 may perform the operation on the motion vectors for each of sub-areas into which the area 902 is divided according to reference direction and motion vectors' magnitude and direction. In such a case, the area 902 is divided into 18 sub-areas, and thus 18 average vectors are provided to the coding unit 104 as representative vectors. Furthermore, the basic motion information generating unit 105 may provide the coding unit 104 only with the average vector, as the basic motion information, of the group having the greatest number of motion vectors among all the motion vector groups in the area 902, or provide the coding unit 104 with the representative vectors, as the basic motion information, of the groups having the greatest and the second greatest numbers of motion vectors among all the motion vector groups in the area 902.

It is to be noted that the present Embodiment 6 has shown the case of dividing the area 902 into nine sub-areas according to magnitude and direction of motion vectors, but the present invention is not limited to this. For example, the area 902 may be separated according to four directions spaced 90°apart from one direction to the next, starting from the x axis, and be separated according to eight directions spaced 45°apart from one direction to the next, starting from the position forming 22.5° with the x axis. In such a case, the area 902 is divided into 17 sub-areas, assuming the same approach for classifying motion vectors by magnitude and direction as shown in FIG. 14.

Furthermore, the present Embodiment 6 has shown that the basic motion information generating unit 105 classifies motion vectors of respective macroblocks into groups and computes an average vector for every group to generate a representative vector for every group, but the present invention is not limited to this. The basic motion information generating unit 105 may classify the motion vectors into groups after computing an average vector for each area. To be more specific, the basic motion information generating unit 105 may compute, for each area of the divided frame 901 for example, an average vector of motion vectors which have been computed from the decoding information and been time-scaled for each macroblock, and an average vector of motion vectors which have been computed from the coding information and been time-scaled for each macroblock; and generate representative vectors after classifying the computed average vectors into groups by their magnitudes and directions.

As shown above, in the present Embodiment 6, the basic motion information generating unit 105 generates, as basic motion information, a representative vector for each of sub-areas into which the area 902 is divided according to magnitude and direction of motion vectors. When estimating motion vectors, a comparison is made between the representative vector derived for each of the sub-areas from the decoding information of an input stream and the representative vector derived for each of the sub-areas from the coding information which was used for coding the previous picture, and then, one of these representative vectors is selected to be used for effectively determining a search range for motion vector estimation. Therefore, it is possible to estimate highly accurate motion vectors even when the search range for the motion vector estimation is narrowed to reduce the processing amount. As a result, it is possible to provide an image coding apparatus capable of coding images by estimating highly accurate motion vectors while reducing the processing amount.

Although only some exemplary embodiments of the image coded apparatus according to the present invention have been described in detail above, the present invention is not limited to such embodiments. Those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention can be applied to image coding apparatuses and methods thereof, and in particular, it can be applied to image coding apparatuses that record, in the H.264 format, HD images of the HDTV broadcast for example.

What is claimed is:

1. An image coding apparatus which converts first coded data coded in a first coding scheme into second coded data coded in a second coding scheme, said image coding apparatus comprising:
    a decoding unit configured to decode the first coded data to generate a decoded picture and to generate decoding information containing motion vectors;
    a coding unit;
    a decoding information holding unit configured to hold the decoding information generated by said decoding unit;
    a coding information holding unit configured to hold coding information generated by said coding unit, the coding information containing motion vectors; and
    a basic motion information generating unit configured to generate basic motion information by comparing (i) information based on the motion vectors contained in the decoding information generated by said decoding unit when generating a currently decoded picture, and (ii) information based on motion vectors used for coding a previously decoded picture previously decoded by said decoding unit prior to said coding unit coding the currently decoded picture which is a current picture to be coded,
    wherein said coding unit is configured to set a search range for searching for motion vectors based on the generated basic motion information, and to code the currently decoded picture which is the current picture to be coded using motion vectors estimated to be within the set search range to generate the second coded data.

2. The image coding apparatus according to claim 1, wherein said basic motion information generating unit is configured to compare the motion vectors contained in the decoding information held by said decoding information holding unit with the motion vectors contained in the coding information held by said coding information holding unit, and to select one of the compared motion vectors having a smaller motion vector variance, to generate the basic motion information.

3. The image coding apparatus according to claim 1, wherein said basic motion information generating unit includes:
    a generating unit configured to generate a first representative vector representing the motion vectors contained in the decoding information and a second representative vector representing the motion vectors contained in the coding information; and
    a selecting unit configured to select one of the first representative vector and the second representative vector as information used to generate the basic motion information.

4. The image coding apparatus according to claim 3, wherein said generating unit includes:
    a first average vector computing unit configured to compute, from the decoding information, an average vector as the first representative vector by averaging the motion vectors each of which corresponds to a macroblock and is contained in the decoding information;
    a first vector variance computing unit configured to compute, from the decoding information, a variance of the motion vectors each of which corresponds to a macroblock and is contained in the decoding information;
    a second average vector computing unit configured to compute, from the coding information, an average vector as the second representative vector by averaging the motion vectors each of which corresponds to a macroblock and is contained in the coding information; and
    a second vector variance computing unit configured to compute, from the coding information, a variance of the motion vectors each of which corresponds to a macroblock and is contained in the coding information,
    wherein said basic motion information generating unit further includes a comparing unit configured to compare a value of the vector variance computed by said first vector variance computing unit and a value of the vector variance computed by said second vector variance computing unit, and
    wherein said selecting unit is configured to select one of the first representative vector and the second representative vector based on the comparison performed by said comparing unit, and to generate the basic motion information by treating the selected representative vector as the basic motion information.

5. The image coding apparatus according to claim 4, wherein said selecting unit is configured to select one of the first representative vector and the second representative vector having a smaller variance value, based on the comparison performed by said comparing unit.

6. The image coding apparatus according to claim 3, wherein said coding information holding unit is configured to hold a plurality of pieces of coding information, each piece of coding information of the plurality of pieces of coding information containing motion vectors of the previously decoded picture which has been coded prior to the currently decoded picture which is the current picture to be coded by said coding unit, and
    wherein said generating unit is configured to generate, from one piece of coding information of the plurality of pieces of coding information held by said coding information holding unit, on a previously decoded picture coded immediately prior to the currently decoded picture to be coded, the second representative vector representing the motion vectors contained in the one piece of the coding information.

7. The image coding apparatus according to claim 3, wherein said generating unit is configured to generate the second representative vector from coding information on a decoded picture having a same picture type as a picture type of the currently decoded picture which is the current picture to be coded by said coding unit, and coded by said coding unit immediately prior to the currently decoded picture to be coded.

8. The image coding apparatus according to claim 4,
wherein said first average vector computing unit is configured to compute, from the decoding information, an average vector that is an average of motion vectors in a forward prediction direction of the currently decoded picture which is the current picture to be coded, each of the motion vectors in the forward prediction direction of the currently decoded picture corresponding to a macroblock, and
wherein said second average vector computing unit is configured to compute, from the coding information, an average vector that is an average of motion vectors in the forward prediction direction of the currently decoded picture to be coded, each of the motion vectors in the forward prediction direction of the currently decoded picture corresponding to a macroblock.

9. The image coding apparatus according to claim 4,
wherein said first average vector computing unit is configured to compute, for each of prediction directions of the currently decoded picture which is the current picture to be coded, an average vector that is an average of motion vectors each corresponding to a macroblock of the currently decoded picture to be coded, from the decoding information,
wherein said second average vector computing unit is configured to compute, for each of the prediction directions of the currently decoded picture to be coded, an average vector that is an average of motion vectors each corresponding to a macroblock of the currently decoded picture to be coded, from the coding information,
wherein the first representative vector is generated for each prediction direction, and includes a first forward representative vector and a first backward representative vector each of which is an average vector computed by said first average vector computing unit for a corresponding one of the prediction directions, and
wherein the second representative vector is generated for each prediction direction, and includes a second forward representative vector and a second backward representative vector each of which is an average vector computed by said second average vector computing unit for a corresponding one of the prediction directions.

10. The image coding apparatus according to claim 4, wherein said first average vector computing unit and said second average vector computing unit are each configured to (i) compute the average vector using a base vector expressed in a length and a direction of a distance between one frame and another frame, when said coding unit codes pictures having a frame structure, and (ii) compute the average vector using a base vector expressed in a length and a direction of a distance between one field and another field, when said coding unit codes pictures having a field structure.

11. The image coding apparatus according to claim 3,
wherein said generating unit is configured to (i) divide, into two or more areas, the currently decoded picture which is the current picture to be coded, (ii) compute, for each of the areas, an average value of the motion vectors computed from the decoding information, and (iii) treat a motion vector having a greatest average value among the computed average values, as the first representative vector, and
wherein said generating unit is configured to (i) divide the currently decoded picture to be coded into two or more areas, (ii) compute, for each of the areas, an average value of the motion vectors computed from the coding information, and (iii) treat a motion vector having a greatest average value among the computed average values, as the second representative vector.

12. The image coding apparatus according to claim 3,
wherein said generating unit is configured to (i) divide, into two or more areas, the currently decoded picture which is the current picture to be coded, (ii) compute, for each of the areas, an average value of the motion vectors computed from the decoding information, and (iii) treat a motion vector having a median value of the computed average values, as the first representative vector, and
wherein said generating unit is configured to (i) divide the currently decoded picture to be coded into two or more areas, (ii) compute, for each of the areas, an average value of the motion vectors computed from the coding information, and (iii) treat a motion vector having a median value of the computed average values, as the second representative vector.

13. The image coding apparatus according to claim 3,
wherein said generating unit is configured to (i) divide, into two or more areas, the currently decoded picture which is the current picture to be coded, (ii) classify average vectors, each of which is an average of motion vectors computed from the decoding information and which is computed for corresponding one of the areas, into groups by magnitude and direction of the average vectors, and (iii) treat a motion vector having an average value of average vectors in a group having a greatest number of average vectors, as the first representative vector, and
wherein said generating unit is configured to (i) divide the currently decoded picture to be coded into two or more areas, (ii) classify average vectors, each of which is an average of motion vectors computed from the coding information and which is computed for corresponding one of the areas, into groups by magnitude and direction of the average vectors, and (iii) treat a motion vector having an average value of average vectors in a group having a greatest number of average vectors, as the second representative vector.

14. The image coding apparatus according to claim 1, wherein said basic motion information generating unit is configured to:
compute, from the decoding information, a first average vector of motion vectors, each of which corresponds to a macroblock, and a first average of sums of absolute values of the motion vectors each of which corresponds to a macroblock;
compute, from the coding information, a second average vector of motion vectors, each of which corresponds to a macroblock, and a second average of sums of absolute values of the motion vectors each of which corresponds to a macroblock; and
compare a difference between the first average vector and the first average of sums of absolute values of the motion vectors with a difference between the second average vector and the second average of sums of absolute values of the motion vectors, and select one of the first average vector and the second average vector having a smaller difference, to generate the basic motion information.

15. The image coding apparatus according to claim 1, wherein said coding unit is configured to compute, from the basic motion information, a sum of motion vectors between the current picture to be coded and a reference picture, and to determine a search range for motion vector estimation for each reference picture of reference pictures, such that a position shifted by the sum of the motion vectors is a center of the search range.

16. An image coding method for converting first coded data coded in a first coding scheme into second coded data coded in a second coding scheme, said image coding method comprising:
- decoding the first coded data to generate a decoded picture and to generate decoding information containing motion vectors;
- coding the decoded picture decoded by said decoding;
- holding, in a memory, the decoding information generated in said decoding of the first coded data;
- holding, in a memory, coding information generated from coding the decoded picture;
- generating basic motion information by comparing (i) information based on the motion vectors contained in the decoding information generated by said decoding when generating a currently decoded picture, and (ii) information based on motion vectors used for coding a previously decoded picture previously decoded by said decoding prior to said coding coding the currently decoded picture which is a current picture to be coded; and
- setting a search range for searching for motion vectors based on the generated basic motion information,
- wherein said coding codes the currently decoded picture which is the current picture to be coded using motion vectors estimated to be within the set search range to generate the second coded data.

17. A non-transitory computer-readable recording medium having a program recorded thereon, the program for coding an image by converting first coded data coded in a first coding scheme into second coded data coded in a second coding scheme, the program causing a computer to execute a method comprising:
- decoding the first coded data to generate a decoded picture and to generate decoding information containing motion vectors;
- coding the decoded picture decoded by said decoding;
- holding, in a memory, the decoding information generated in said decoding of the first coded data;
- holding, in a memory, coding information generated from coding the decoded picture;
- generating basic motion information by comparing (i) information based on the motion vectors contained in the decoding information generated by said decoding when generating a currently decoded picture, and (ii) information based on motion vectors used for coding a previously decoded picture previously decoded by said decoding prior to said coding coding the currently decoded picture which is a current picture to be coded; and
- setting a search range for searching for motion vectors based on the generated basic motion information,
- wherein said coding codes the currently decoded picture which is the current picture to be coded using motion vectors estimated to be within the set search range to generate the second coded data.

18. An integrated circuit which codes an image by converting first coded data coded in a first coding scheme into second coded data coded in a second coding scheme, said integrated circuit comprising:
- a decoding unit configured to decode the first coded data to generate a decoded picture and to generate decoding information containing motion vectors;
- a coding unit;
- a decoding information holding unit configured to hold the decoding information generated by said decoding unit;
- a coding information holding unit configured to hold coding information generated by said coding unit; and
- a basic motion information generating unit configured to generate basic motion information by comparing (i) information based on the motion vectors contained in the decoding information generated by said decoding unit when generating a currently decoded picture, and (ii) information based on motion vectors used for coding a previously, decoded picture previously decoded by said decoding unit prior to said coding unit coding the currently decoded picture which is a current picture to be coded,
- wherein said coding unit is configured to set a search range for searching for motion vectors based on the generated basic motion information, and to code the currently decoded picture which is the current picture to be coded using motion vectors estimated to be within the set search range to generate the second coded data.

* * * * *